(12) United States Patent
Bade et al.

(10) Patent No.: US 12,475,379 B1
(45) Date of Patent: Nov. 18, 2025

(54) SYSTEMS AND METHODS FOR TRAINING MULTIMODAL SELF-SUPERVISED MODELS

(71) Applicant: Anumana, Inc., Cambridge, MA (US)

(72) Inventors: Sairam Bade, Thelangana (IN); Rakesh Barve, Bengaluru (IN); Ashim Prasad, Bangalore (IN); Yash Mishra, Bangalore (IN)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 19/058,730

(22) Filed: Feb. 20, 2025

(51) Int. Cl.
*G06N 3/088* (2023.01)
*G06N 3/0895* (2023.01)
*G06T 11/60* (2006.01)
*G16H 10/60* (2018.01)

(52) U.S. Cl.
CPC ............ *G06N 3/0895* (2023.01); *G06T 11/60* (2013.01); *G16H 10/60* (2018.01); *G06T 2210/32* (2013.01); *G06T 2210/41* (2013.01)

(58) Field of Classification Search
CPC .................. G06N 3/0895; G06T 11/60; G06T 2210/32; G06T 2210/41; G16H 10/60
See application file for complete search history.

(56) References Cited

U.S. PATENT DOCUMENTS

| | | | |
|---|---|---|---|
| 2019/0197366 A1 | 6/2019 | Kecskemethy et al. | |
| 2020/0006988 A1* | 1/2020 | Leabman | A61B 8/56 |
| 2021/0007607 A1* | 1/2021 | Frank | A61B 5/14552 |
| 2021/0056413 A1 | 2/2021 | Cheung | |
| 2021/0280322 A1* | 9/2021 | Frank | G16H 50/20 |
| 2021/0304866 A1* | 9/2021 | Kuusela | A61N 5/1039 |
| 2023/0067528 A1 | 3/2023 | Guo et al. | |
| 2024/0164688 A1* | 5/2024 | Asirvatham | G06N 3/088 |

FOREIGN PATENT DOCUMENTS

| | | |
|---|---|---|
| IN | 202441005845 A | 2/2024 |
| WO | 2024237962 A1 | 11/2024 |

\* cited by examiner

*Primary Examiner* — Brandon S Cole
(74) *Attorney, Agent, or Firm* — Caldwell Intellectual Property Law

(57) ABSTRACT

A system for training multimodal self-supervised models, the system including a computing device configured to receive a multimodal dataset encode each data entry of a plurality of data entries into a single data format to create an encoded multimodal dataset including one or more encoded modalities, identify one or more embedded pairs as a function of the one or more encoded modalities, wherein each embedded pair of the one or more embedded pairs is associated with a separate patient of the plurality of patients, map the embedded pairs within a shared embedding space, pretrain an ECG machine learning model as a function of the mapping by adjusting one or more parameter values of the ECG machine learning model, receive labeled training data and train the pretrained ECG machine learning model as a function of the labeled training data.

20 Claims, 8 Drawing Sheets

SYSTEMS AND METHODS FOR TRAINING MULTIMODAL SELF-SUPERVISED MODELS

FIELD OF THE INVENTION

The present invention generally relates to the field of machine learning models. In particular, the present invention is directed to systems and methods for training multimodal self-supervised models.

BACKGROUND

In healthcare, electrocardiogram data exists in diverse formats such as raw digital signals, scanned or photographed ECG prints, and is often disconnected from critical contextual information in Electronic Health Records (EHR). This lack of integration makes it difficult for clinicians and other systems to analyze data holistically, leading to inefficiencies in diagnosing medical conditions.

SUMMARY OF THE DISCLOSURE

In an aspect, a system for training multimodal self-supervised models is described. The system includes at least a processor, and a memory communicatively connected to the at least a processor. The memory contains instructions configuring the at least a processor to receive a multimodal dataset including one or more modalities associated with a plurality of patients, wherein each modality includes a plurality of data entries, encode each data entry of the plurality of data entries within each modality of the one or more modalities into a single data format to create an encoded multimodal dataset including one or more encoded modalities, identify one or more embedded pairs as a function of the one or more encoded modalities, wherein each embedded pair of the one or more embedded pairs is associated with a separate patient of the plurality of patients, map the embedded pairs within a shared embedding space, pretrain an ECG machine learning model as a function of the mapping by adjusting one or more parameter values of the ECG machine learning model, receive labeled training data and train the pretrained ECG machine learning model as a function of the labeled training data.

In another aspect, a method for training multimodal self-supervised models, the method includes receiving, by at least a processor, a multimodal dataset including one or more modalities associated with a plurality of patients, wherein each modality includes a plurality of data entries, encoding, by the at least a processor, each data entry of the plurality of data entries within each modality of the one or more modalities into a single data format to create an encoded multimodal dataset including one or more encoded modalities, identifying, by the at least a processor, one or more embedded pairs as a function of the one or more encoded modalities, wherein each embedded pair of the one or more embedded pairs is associated with a separate patient of the plurality of patients, mapping, by the at least a processor, the embedded pairs within a shared embedding space, pretraining, by the at least a processor, an ECG machine learning model as a function of the mapping by adjusting one or more parameter values of the ECG machine learning model, receiving, by the at least a processor, labeled training data and training, by the at least a processor, the pretrained ECG machine learning model as a function of the labeled training data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for training multimodal self-supervised modals. In an embodiment, aspect of the present disclosure include a computing device configured to receive a multimodal data set, one or more encoders configured to encode the multimodal data self, and a shared embedding space configured to map the outputs of the encoders.

Aspects of the present disclosure can be used to train machine learning models using more than one modality. Aspects of the present disclosure can also be used to train a machine learning model based on features identified in other modalities. This may be done by encoding data from differing modalities and utilizing a projection layer to map embeddings into a shared embedding space. Exemplary embodiments illustrating aspects of the present disclosure are described below in the context of several specific examples.

Figure 1:
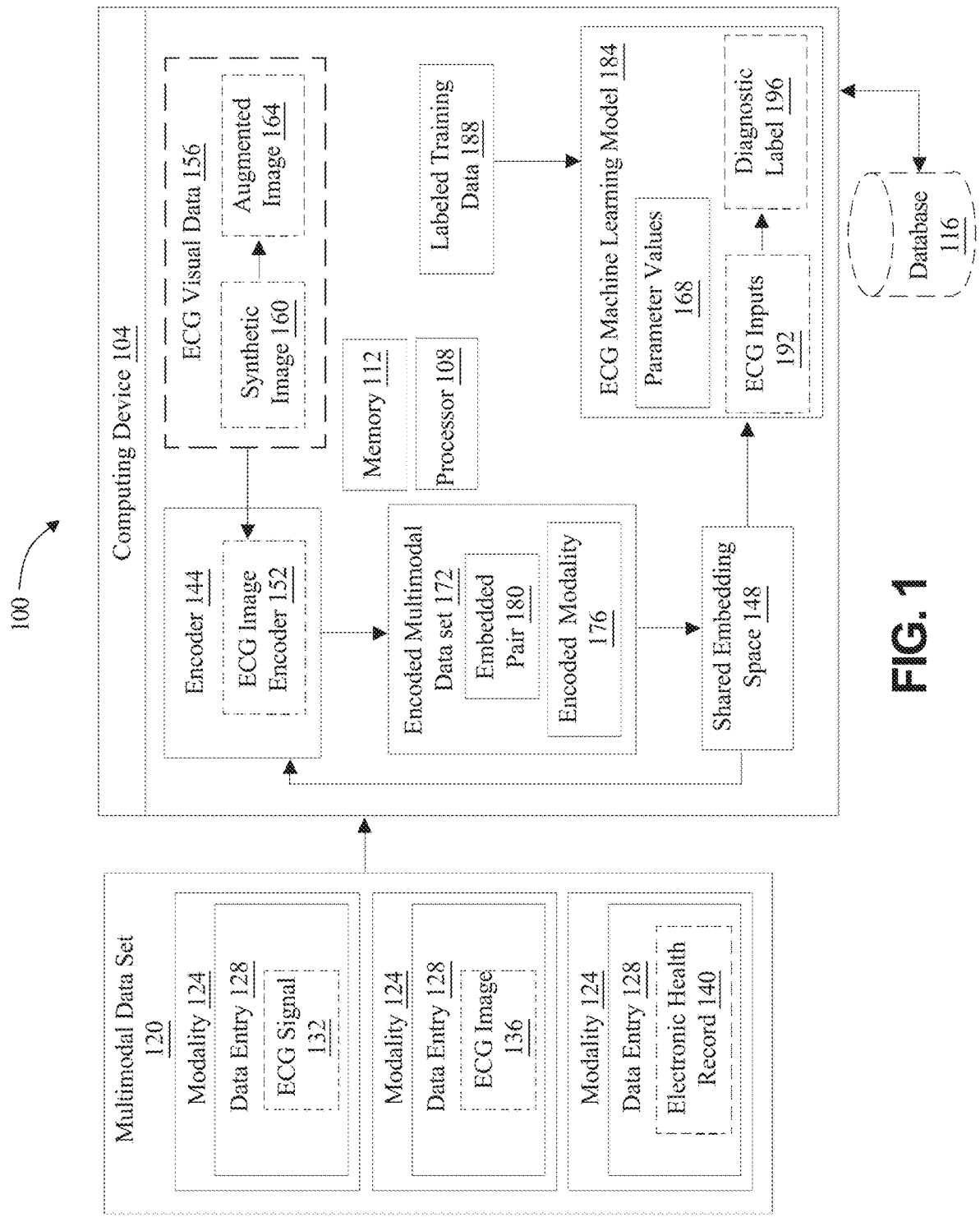
FIG. 1 is an exemplary embodiment of a system for training multimodal self-supervised models.

Referring now to FIG. 1, a system 100 for training machine learning multimodal self-supervised models is described. System 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device 104. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiments, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register is configured to synchronize the processor with other computing components. In one or more embodiments, processor 108 may include more than one processing unit having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU is configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

Still referring to FIG. 1, System 100 may include a database 116. Database may include a remote database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device 104. In one or more embodiments, computing device 104 may transmit processes to server wherein computing device 104 may conserve power or energy.

With continued reference to FIG. 1, processor 108 is configured to receive a multimodal dataset 120. A "multimodal dataset" as described in this disclosure refers to a collection of data that contains differing formats of information. For example, and without limitation, multimodal dataset 120 may include images, signals, documents and/or the like. In one or more embodiments, multimodal dataset 120 may include a plurality of modalities 124. A "modality" as described in this disclosure refers to a particular type of information within multimodal dataset 120. For example, and without limitation, a first modality 124 may include data in the form of signals, whereas a second modality 124 may include data in the form of images. In an embodiment, modalities 124 may include various types and/or forms of input data that is used by one or more machine learning models as described in this disclosure. In one or more embodiments, modality 124 may include differing or assorted medical tests, such as but not limited to, a blood test, a urine test, a recorded electrocardiogram signal, an intracardiac echocardiography (ICE) image, a heart rate, oxygen saturation levels and/or the like. In one or more embodiments, each modality 124 may include a differing set of information commonly found within a medical record and/or electronic health record. In one or more embodiments, each modality 124 within multimodal dataset 120 may refer to a separate category of information. For example and without limitation, a first modality 124 may include information in the form of signals, whereas a second modality 124 may include information within the form of imagery. In one or more embodiments, multimodal dataset 120 may include one or more modalities 124 wherein at least one modality 124 may include signals, such as electrocardiogram signals, at least one modality 124 may include images of electrocardiogram signals and/or at least one modality 124 may include patient health records.

With continued reference to FIG. 1, multimodal dataset 120 may include a plurality of data entries 128. A "data entry" for the purposes of this disclosure refers to a unit of information within multimodal dataset 120. In an embodiment, each data entry 128 may include an independent piece of information. For example, and without limitation, a single data entry 128 may include a set of electrocardiogram signals, an image or set of similar images, a patient electronic health record 140 and/or the like. In one or more embodiments, multimodal dataset 120 may include a plurality of data entries 128. In one or more embodiments, each modality 124 within multimodal dataset 120 may include and/or be included in a plurality of data entries 128.

With continued reference to FIG. 1, data entries 128 may include electrocardiogram data. In one or more embodiments, Electrocardiogram data may include electrocardiogram signals. In one or more embodiments, at least one modality 124 may be associated with electrocardiogram data and/or electrocardiogram (ECG) signals. "Electrocardiogram data" for the purposes of this disclosure is information associated with electrocardiogram signals. In one or more embodiments, electrocardiogram data may include a matrix having a plurality of electrocardiogram signals and/or associated time variables. A "matrix" for the purposes of this disclosure is an array of numbers or characters arranged in rows or columns which are used to represent an object or properties of the object. For example, and without limitation, a matrix may be used to describe linear equations, differential equations, in a two-dimensional format. In another non limiting example, a matrix may be used to create graphs based on data points, generate statistical models and the like. In one or more embodiments, matrix may include a plurality of electrocardiogram signals associated with a plurality of time variables. As used in the current disclosure, an "electrocardiogram signal" is a signal representative of electrical activity of heart. The ECG signal 132 may consist of several distinct waves and intervals, each representing a different phase of the cardiac cycle. These waves may include the P-wave, QRS complex, T wave, U wave, and the like. The P-wave may represent atrial depolarization (contraction) as the electrical impulse spreads through the atria. The QRS complex may represent ventricular depolarization (contraction) as the electrical impulse spreads through the ventricles. The QRS complex may include three waves: Q wave, R wave, and S wave. The T-wave may represent ventricular repolarization (recovery) as the ventricles prepare for the next contraction. The U-wave may sometimes be present after the T wave, it represents repolarization of the Purkinje fibers. The intervals between these waves may provide information about the duration and regularity of various phases of the cardiac cycle. The ECG signal 132 may help diagnose various heart conditions, such as arrhythmias, myocardial infarction (heart attack), conduction abnormalities, and electrolyte imbalances. In one or more embodiments, ECG signals may be received by one or more electrodes connected to the skin of an individual. In one or more embodiments, ECG signals may represent depolarization and repolarization occurring in the heart. In one or more embodiments, ECG signals may be captured periodically. For example, and without limitation, every second, every millisecond and the like. In one or more embodiments, each ECG signal 132 may contain an associated time variable. "Time variable" for the purposes of this disclosure is information indicating the time at which a particular ECG signal 132 was received. For example, and without limitation, time variable may include, 5 ms, 10 ms, 15 ms and the like. In one or more embodiments, each ECG signal 132 may contain a time variable. In one or more embodiments, time variable may increase in given increments, such as for example, in increments of 5 ms, wherein a first time variable may include 5 ms and a second time variable may include 10 ms. In one or more embodiments, a combination of a plurality of ECG signals and correlated time variable may be used to generate a graph illustrating the heart functions of an individual. In one or more embodiments, matrix may include a plurality of ECG signals and correlated time variable during a given time frame such as, for example, over the span of a second, a minute, an hour, and the like. In one or more embodiments, ECG signals may be captured as voltages, such as millivolts or microvolts.

With continued reference to FIG. 1, the plurality of electrocardiogram signals may capture a temporal view of cardiac electrical activities. A "temporal view," as used in the current disclosure, refers to the analysis and visualization of heart-related events and phenomena over time. A temporal view may include patterns, changes, and dynamics of cardiac activity over time. A temporal view may include information surrounding the rhythm of the heart, including the regularity or irregularity of heartbeats. It allows for the identification of various rhythm abnormalities such as tachycardia (fast heart rate), bradycardia (slow heart rate), or arrhythmias (irregular heart rhythms). A temporal view of cardiac activities in three dimensions may refer to a visualization that represents the temporal evolution of cardiac events or phenomena in a three-dimensional space. It provides a comprehensive understanding of how various cardiac activities change over time. The ECG signal 132 may move through the D space of the heart over time. The signal does not just move forward in time, it also moves through the physical space of the heart, from SA node through atria, to AV node, and then through the ventricles. Such movement of the electrical signal through the heart's physical space over time can be referred to as "spatiotemporal excitation and propagation" which could be captured by plurality of ECG signals. It is essentially a way of observing and analyzing the timing and sequence of the heart's electrical activity as it moves through the physical structure of the heart. In the current case the dimensions may include axis representing time, spatial dimensions, and cardiac activity. By combining the temporal, spatial, and cardiac activity dimensions, the temporal view of cardiac activities in three dimensions allows for a comprehensive visualization and analysis of dynamic changes occurring within the heart. It can be used to study phenomena like electrical conduction, ventricular wall motion, valve function, blood flow dynamics, or the interaction between different regions of the heart. This visualization approach provides valuable insights into the complex temporal dynamics of cardiac activities and aids in understanding cardiac function, pathology, and treatment evaluation.

With continued reference to FIG. 1, matrix and/or ECG signals may be received through one or more input devices.

"Input device" for the purposes of this disclosure is a device capable of transmitting information to computing device. For example, and without limitation, input device may include a keyboard, a mouse, a touchscreen, a smartphone, a network server, a sensor and the like. In one or more embodiments, input device may include a sensor. In one or more embodiments, matrix and/or ECG signals may be received by input device and/or sensor. As used in this disclosure, a "sensor" is a device that is configured to detect an input and/or a phenomenon and transmit information related to the detection. Sensor may detect a plurality of data. A plurality of data detected by sensor may include, but is not limited to, electrocardiogram signals, heart rate, blood pressure, electrical signals related to the heart, time variables associated with captured data and the like. In one or more embodiments, and without limitation, sensor may include a plurality of sensors. In one or more embodiments, and without limitation, sensor may include one or more electrodes, and the like. Electrodes used for an electrocardiogram (ECG) are small sensors or conductive patches that are placed on specific locations on the body to detect and record the electrical signals generated by the heart. Senor may serve as the interface between the body and the ECG machine, allowing for the measurement and recording of the heart's electrical activity. A plurality of sensors may include electrodes used for a standard –lead ECG, placed in specific positions on the chest and limbs of the patient. These electrodes are typically made of a conductive material, such as metal or carbon, and are connected to lead wires that transmit the electrical signals to the ECG machine for recording. In one or more embodiments, plurality of ECG signals may be associated with a –lead electrocardiogram. Proper electrode placement is crucial to ensure accurate signal detection and recording. In one or more embodiments, sensors may include wireless sensors wherein data may be received from sensor to computing device wirelessly. In one or more embodiments, wireless sensors may include Bluetooth enabled ECG sensors, RFID ECG sensors, Wi-Fi enabled ECG sensors and the like. In one or more embodiments, wireless sensors may allow for receipt of data from a distance. In one or more embodiments, wireless sensors may allow for a machine or system to receive data without wires connecting the sensors to computing device. In one or more embodiments, the presence of wires from sensors to computing device may obstruct medical personnel from conducting one or more medical treatment procedures.

With continued reference to FIG. 1, the plurality of sensors may be placed on each limb, wherein there may be at least one sensor on each arm and leg. These sensors may be labeled I, II, III, V1, V2, V3, V4, V5, V6, and the like. For example, Sensor I may be placed on the left arm, Sensor II may be placed on the right arm, and Sensor III may be placed on the left leg. Additionally, a plurality of sensors may be placed on various portions of the patient's torso and chest. For example, a sensor V1 may be placed in the fourth intercostal space at both the right sternal borders and sensor V2 may be fourth intercostal space at both the left sternal borders. A sensor V3 may also be placed between sensors V2 and V4, halfway between their positions. Sensor V3 may be placed in the fifth intercostal space at the midclavicular line. Sensor V4 may be placed horizontally at the same level as sensor V5 but in the anterior axillary line. Sensor V may be placed horizontally at the same level as V and V but in the midaxillary line. In one or more embodiments, each sensor and/or lead may contain a set of electrical signals, wherein matrix may include ECG signals associated with each lead and/or sensor.

With continued reference to FIG. 1, the plurality of sensors may be placed on each limb, wherein there may be at least one sensor on each arm and leg. These sensors may be labeled I, II, III, V1, V2, V3, V4, V5, V6, and the like. For example, Sensor I may be placed on the left arm, Sensor II may be placed on the right arm, and Sensor III may be placed on the left leg. Additionally, a plurality of sensors may be placed on various portions of the patient's torso and chest. For example, a sensor V1 may be placed in the fourth intercostal space at both the right sternal borders and sensor V2 may be fourth intercostal space at both the left sternal borders. A sensor V3 may also be placed between sensors V2 and V4, halfway between their positions. Sensor V4 may be placed in the fifth intercostal space at the midclavicular line. Sensor V5 may be placed horizontally at the same level as sensor V4 but in the anterior axillary line. Sensor V6 may be placed horizontally at the same level as V4 and V5 but in the midaxillary line. In one or more embodiments, each sensor and/or lead may contain a set of electrical signals, wherein matrix may include ECG signals associated with each lead and/or sensor.

With continued reference to FIG. 1, the plurality of sensors may include augmented unipolar sensors. These sensors may be labeled as aVR, aVL, and aVF. These sensors may be derived from the limb sensors and provide additional information about the heart's electrical activity. These leads are calculated using specific combinations of the limb leads and help assess the electrical vectors in different orientations. For example, aVR may be derived from Sensor II and Sensor III. In another example, aVL may be derived from sensor I and Sensor III. Additionally, aVF may be derived from Lead I and Lead II. The combination of limb sensors, precordial sensors, and augmented unipolar sensors allows for a comprehensive assessment of the heart's electrical activity in three dimensions. These leads capture the electrical signals from different orientations, which are then transformed into transformed coordinates to generate vectorcardiogram (VCG) representing magnitude and direction of electrical vectors during cardiac depolarization and repolarization. Transformed coordinates may include one or more a Cartesian coordinate system (x, y, z), polar coordinate system (r, θ), cylindrical coordinate system (ρ, φ, z), or spherical coordinate system (r, θ, φ). In some cases, transformed coordinates may include an angle, such as with polar coordinates, cylindrical coordinates, and spherical coordinates. In some cases, VCG may be normalized thus permitting full representation with only angles, i.e., angle traversals. In some cases, angle traversals may be advantageously processed with one or more processes, such as those described below and/or spectral analysis.

With continued reference to FIG. 1, in one or more embodiments, sensor may include surface electrodes wherein the surface electrodes may be placed above the skin of a user and used to detect electrical impulses. In one or more embodiments, sensor may further include a wearable ECG monitor wherein the wearable ECG monitor may be wrapped around a limb of the individual and used to detect electrical impulses. In one or more embodiments, sensor may further include a Holter monitor, subdermal needle electrodes, and/or any other sensing device capable of receiving electrical signals.

With continued reference to FIG. 1, matrix may include a plurality of ECG signals captured at discrete time intervals. In one or more embodiments, matrix may be generated and/or received in a digital imaging and communications in medicine (DICOM) Format, a CSV format, as a spread sheet containing cells for each datum and the like. In one or more embodiments, computing device may receive data in a raw format wherein the data may be converted into a matrix.

With continued reference to FIG. 1, ECG signals received from each sensor may be referred to as an 'ECG set.' In one or more embodiments, an ECG set may include ECG signals captured from a singular sensor over a given period of time. In one or more embodiments, ECG data may include a plurality of ECG sets wherein each ECG sets may correspond to a differing input device differing sensor and the like in contact with an individual. In one or more embodiments, each ECG set may correspond to a different surface electrode in contact with an individual. In one or more embodiments, ECG data may include ECG sets wherein ECG sets include similar timeframes in which ECG signals are captured. For example, and without limitation, an 8-lead system may include ECG sets wherein each ECG set corresponds to a particular lead.

With continued reference to FIG. 1, processor 108 may be configured to receive plurality of ECG data. In one or more embodiments, ECG data may be received in textual format. A "Textual format" for the purposes of this disclosure is a format in which a set of data is represented by characters, numbers or any other alphanumeric representations. For example, and without limitation, a set of data may be said to be in textual format in instances in which the contents of the file contain only characters of readable material. In one or more embodiments, data in textual format may be contrasted with an image, video and the like. In one or more embodiments, data within a textual format may include machine-readable alphanumeric characters. In one or more embodiments, data within a textual format may include data such as .txt, .docx, .xlsx and the like. In one or more embodiments, ECG data may be received in textual format wherein ECG data may include textual data corresponding to Leads and corresponding voltage signals of the leads.

In one or more embodiments, ECG data may include matrix and/or an array of data wherein matrix may include matrix of size N×T, where N is the number of leads in the ECG and T is the number of voltage signals recorded in that ECG. In one or more embodiments, 'T' will depend on the frequency of the acquired ECG data (referred to herein as 'f') and the length of the signal in seconds (referred to herein as 's'), i.e., T=f*S. In one or more embodiments, matrix may include a two dimensional array having size of N×T wherein N may denote the number and/or particular leads, and T may denote the voltage signals. In one or more embodiments, ECG data may be received in a 3-dimensional array of N×T×S wherein s may denote the seconds and/or time corresponding to each voltage signal. In one or more embodiments, ECG data may include a matrix having one or more leads and voltage signals associated with each of the one or more leads. In an embodiment, each lead may be configured to receive voltage signals from a patient wherein ECG data may include voltage signals from each lead on the patient. In one or more embodiments, leads may include any leads as described above. In one or more embodiments, each ECG data may include data received from multiple leads in contact with a patient. In one or more embodiments, processor 108 may be configured to receive a plurality of ECG data wherein each ECG data is associated with a particular individual and/or medical patient. In one or more embodiments, ECG data may contain voltage signals over a given period of time and/or ECG signals. In one or more embodiments, each voltage signal within ECG data may contain corresponding time variable (as described above) wherein time variable denotes the time at which the particular voltage signal was received. In an embodiment, matrix may include an array for each lead wherein the array contains voltage signals and time variables associated with the voltage signals. In one or more embodiments, sensors associated with each lead may be configured to receive voltage signals and corresponding time variables. In one or more embodiments, ECG data may be received from a plurality of patients, from a database 116, from a web using a web crawler and the like. In one or more embodiments, each set of ECG data may correspond to a particular individual and/or patient. In one or more embodiments, ECG data may contain ECG signals received from each sensor of a plurality of sensors that were in contact with a patient. In one or more embodiments, the sensors may be configured to receive ECG signals and associated time variables denoting the time at which the ECG signal 132 was received. In one or more embodiments, ECG signals may be received from an or lead ECG wherein each lead includes a sensor configured to receive ECG signals from a particular portion of an individual's body. In one or more embodiments, ECG data may contain ECG signals from multiple electrodes recorded over a similar time frame. For example, and without limitation, ECG data may include ECG signals received from multiple electrodes over a similar timeframe of 0 to 10 seconds.

With continued reference to FIG. 1, multimodal dataset 120 may include a plurality of ECG images 136. In one or more embodiments, at least one modality 124 may include a plurality of ECG images 136 associated with the ECG data. In one or more embodiments, plurality of data entries 128 may include a plurality of ECG images 136. An "ECG image," for the purposes of this disclosure, is a graphical or visual representation of electrocardiogram signals depicted as a photographic or scanned image. For example, and without limitation, ECG image 136 may include a photograph of ECG signals, a chart of ECG signals on a paper that has been scanned and the like. In one or more embodiments, ECG image 136 may include a two dimensional plot in which electrocardiogram signals are graphed over a given period of time. In one or more embodiments, ECG image 136 may include a scanned image of an electrocardiogram plot. In one or more embodiments, ECG image 136 data may include images, scanned physical documents and/or data that has been given the appearance of a scanned physical document. For example, and without limitation, ECG image 136 data may include images received from a scanner, images received from a camera, images received from a scanning device and the like. In one or more embodiments, ECG image 136 data may include a digitized version of image captured from various sources such as a camera and/or any other input devices. In one or more embodiments, ECG image 136 data may include digitized paper prints. In one or more or more embodiments, different printers may create paper ECG in different ECG layouts as mentioned above. In one or more embodiments, printers may include but are not limited to, Thermal printers, Laser printers, Inkjet printers, Ink-tank printers, Dot-matrix printers and the like. In one or more embodiments, computing device and/or a separate computing system may be used to print ECG signals in graphical format using a variety of printers. In one or more embodiments, images may be black and white, color, have varying brightness, have varying contrast and the like. In one or more embodiments, paper prints may also be generated by printing via an ECG device by feeding in raw voltage-time series data. The ECG prints received from the ECG device may be similar to those found in clinical settings. Paper prints may also be generated by taking a printout of PDF version of the ECG signal 132 except that instead of printing to ECG machine printer—it would be saved as PDF in ECG machine and would be exported out and printed in various layout formats using one of the printers mentioned above. In one or more embodiments, ECG image 136 data may contain a plurality of non-conforming images. A "non-conforming image" for the purposes of this disclosure is an image differing in quality, format, and the like in comparison to other images. In one or more embodiments, ECG image 136 data may contain a plurality of nonconforming images wherein images may contain differing light intensities, differing resolutions, differing formats and the like. In one or more processor 108 may be configured to simulate a plurality of input devices wherein images within ECG image 136 data may vary in brightness, contrast, size and the like. In one or more embodiments, each image within ECG image 136 data may be correlated to ECG signals within ECG data and/or correlated with synthetic image 160 within ECG visual data 156. In one or more embodiments, each ECG image 136 may be correlated with a particular ECG signal 132 and/or ECG data. In one or more embodiments at least one modality 124 may include information in the form of Electrocardiogram signals, while a second modality 124 may include the same or similar information in the form of imagery. In one or more embodiments, ECG image 136 data may include physical printouts of ECG data. In one or more embodiments, each set of ECG data may include a corresponding ECG image 136 data depicting the ECG signals in a visual format. In one or more embodiments, at least one modality 124 may include ECG signals received in the form of imagery. In one or more embodiments, plurality of data entries 128 may include a plurality of ECG images 136.

With continued reference to FIG. 1, in one or more embodiments, at least one modality 124 may include a plurality of electronic health records 140. In one or more embodiments, plurality of data entries 128 may include a plurality of electronic health records 140. An "electronic health record 140," for the purposes of this disclosure, is digital information associated with an individual's health. For example, and without limitation, electronic health record 140 may include medications an individual is taking, recent diagnosis, recent treatment, laboratory test results and the like. In one or more embodiments, an individual may seek medical treatment wherein information about the patient may be recorded in electronic health record 140 during and/or following treatment. A "patient" for the purposes of this disclosure is any individual currently seeking or has previously sought medical treatment. For example, and without limitation, patient may include an individual who has sought treatment in the past, who has undergone medical testing and the like. In one or more embodiments, a patient may include an individual who has previously sought medical treatment. In one or more embodiments, electronic health record 140 may include patient demographics. In one or more embodiments, patient demographics may include information about the patient's age, sex, race/ethnicity, family history of Barrett's esophagus (BE) or esophageal adenocarcinoma (EAC) and the like. In one or more embodiments, electronic health record 140 may include the medical history of a patient. Medical history may include but is not limited to information about the patient's medical history, such as comorbidities (e.g., coronary artery disease), symptoms (e.g., heartburn, dyspepsia), previous diagnoses (e.g., gastroesophageal reflux disease), previous medical treatments, previous weight, previous height and the like. In one or more embodiments, electronic health record 140 may include medications taken by the patient and/or prescribed to the patient. In one or more embodiments, medications may include treatment plans, dosing of medication and the like. In one or more embodiments, electronic health records 140 may include laboratory tests. Laboratory tests may include results such as blood tests (e.g., hemoglobin, cholesterol levels) and electrolyte levels. In one or more embodiments, laboratory tests may include any information typically given as part of a blood test, urine test and the like. In one or more embodiments, electronic health record 140 may include medical procedures. Medical procedures may provide information about any endoscopy procedures the patient has undergone, as well as the presence of specific keywords in pathology notes. In one or more embodiments, electronic health record 140 may further include risk factors as determined by a physician and indicated within electronic health record 140. Risk factors may include established risk factors for BE and EAC, such as age, sex, smoking status, and obesity. In one or more embodiments, electronic health record 140 may include any information associated with an individual seeking or who has sought medical treatment. In one or more embodiments, electronic health records 140 may include any medical information associated with a patient that is received in the ordinary course of medical treatment.

With continued reference to FIG. 1, each electronic health record 140 may be associated with a single patient wherein a plurality of health records may be associated with a plurality of patients. In one or more embodiments, electronic health record 140 may include prescriptions written, notes written by a physician, scans of medical documents and the like. In one or more embodiments, each electronic health record 140 may include dates associated with each element within electronic health record 140. For example, and without limitation, electronic health record 140 may include a date in which a mediation was prescribed, a date in which laboratory testing was conducted, a date in which treatment was provided, a date in which a diagnosis was given and the like. In one or more embodiments, any information recorded within electronic health record 140 may include a date of recordation. In one or more embodiments, laboratory results, medication, treatment, doctors, visits, recordation of previous medical history and the like may have a date indicating when the information was recorded.

With continued reference to FIG. 1, electronic health records 140 may be received from a database 116 such as patient database. A "patient database," for the purposes of this disclosure, is a database 116 having medical information associated with patients. In one or more embodiments, patient database may include an EHR database and/or any other database 116 that is configured to store electronic health records 140. In one or more embodiments, database 116 may include patient database. In one or more embodiments, patient database may include a plurality of electronic health records 140 of a plurality of patients. In one or more embodiments, patient database may be iteratively updated with new information associated with patients, such as for example, new medications prescribed, new treatments provided and the like. In one or more embodiments, electronic health record 140 may be received from an EHR database. In an embodiment, an HER database 116 may include a collection of patient databases that contain information associated with a patient's health. In one or more embodiments, individuals may be given access to EHR database such that individuals may access electronic health records 140. In one or more embodiments, EHR database may include de-identified information wherein de-identified information includes information in which identifiers have been removed. For example, and without limitation, de-identified information may include an electronic health record 140 in which the name of the patient, social security number of the patient and/or any other information that may be used to identify the patients, is removed. In one or more embodiments, electronic heath records may be de-identified wherein information used to identify the patient is removed. In one or more embodiments, plurality of electronic health records 140 may be received from a user of system, a medical professional and the like.

With continued reference to FIG. 1, multimodal dataset 120 may include information associated with a plurality of patients. In one or more embodiments, multimodal dataset 120 may include ECG signals, ECG images 136 and/or electronic health records 140. In one or more embodiments, multimodal dataset 120 may include a plurality of data pairs. A "data pair" for the purposes of this disclosure refers to data entries 128 within multimodal dataset 120 corresponding to the same patient. For example and without limitation, data pair may include an ECG signal 132, an ECG image 136 and/or an electronic health record 140 within multimodal dataset 120 all corresponding to the same patient. In one or more embodiments, data pair may include a data entry 128 from each modality 124. In an embodiment, multimodal dataset 120 may include information associated with a patient, wherein the information may be separated into one or more modalities 124. In one or more embodiments, information associated with patients may be categorized based on their respective modality 124. In one or more embodiments, each data entry 128 within multimodal dataset 120 may belong to at least one data pair. In one or more embodiments, multimodal dataset 120 may include information associated with a plurality of patients, wherein information associated with each patient may be contained within each modality 124. In one or more embodiments, a data pair may include a data entry 128 from each modality 124 associated with the same patient. In one or more embodiments, ECG signals and/or ECG data within a first modality 124 may contain an associated ECG image 136 in a second modality 124 both containing the same or similar information in differing formats.

With continued reference to FIG. 1 multimodal dataset 120 may be received by a user, $3^{rd}$ party, using a WebCrawler and/or the like. In one or more embodiments, multimodal dataset 120 may be received from a database 116, such as patient database and/or the like.

With continued reference to FIG. 1, processor 108 is configured to encode each data entry 128 of plurality of data entries 128 within multimodal dataset 120. In one or more embodiments, processor 108 may use one or more encoders to encode each data entry 128 of plurality of data entries 128. An "encoder" as described in this disclosure is a system or software configured to receive raw data as inputs and translate said inputs into a format that can be used by another system or software. For example, and without limitation, an encoder 144 may include a system configured to receive signals in the form of frequencies and convert the signals into information into a digital format. In one or more embodiments, encoders may be used to convert information associated with differing formalities into a common data format. For example, and without limitation, data entries 128 may be converted such that data entries 128 from differing modalities 124 are in the same or similar data format. In one or more embodiments, encoders may include any machine learning models as described in this disclosure. In one or more embodiments, encoders may process input data of different modalities 124 (E.G., ECG images 136, raw ECG signals, and electronic health records 140) and transform these inputs into a shared, structured representation. In one or more embodiments, encoders may include neural network models specifically designed to extract features from input data and represent these features as high-dimensional vectors in a latent space. In one or more embodiments, in one or more embodiments, encoder 144 may include a specialized neural network designed to process input data (such as images, signals, or text) and transform it into a condensed, high-dimensional numerical representation called an embedding. An "embedding" for the purposes of this disclosure is a numerical representation of information that is encoded as a vector of real numbers. In one or more embodiments, embeddings may capture important features of data that can be used for analyzing the data and/or using the data in other systems such as machine learning models. In one or more embodiments, embeddings may include vectors that can be used for machine learning models. In one or more embodiments, embeddings may serve as bridge between raw data and software such as machine learning algorithms. In one or more embodiments, embeddings may be used to convert data associated with differing modalities 124 into a standard and/or common data format. In one or more embodiments, embeddings may be used to extract features from data entries 128 that are meaningful for training machine leaning models. In one or more embodiments, embeddings may capture features of the input data in a way that can be used for downstream tasks, such as but not limited to, classification, prediction, or comparison with other data types. In one or more embodiments, embeddings may reduce high dimensional and/or complex data into lower-dimensional vector representation. In one or more embodiments, embeddings may capture meaningful and/or relevant features pertinent to training machine learning models while filtering out unwanted features such as noise. In one or more embodiments, embeddings may be used to determine a relationship between two differing inputs. For example, and without limitation, embeddings may be used to determine a relationship between an ECG signal 132 and ECG image 136. In one or more embodiments, embeddings may allow for increased computational efficiency wherein data may be reduced into a lower dimensional space. For example, and without limitation, pixels in images may be transformed into vectors wherein a computing system may make determinations using the vectors.

With continued reference to FIG. 1, encoder 144 may be configured to apply transformations using layers of a neural network. This process may identify and capture important features or patterns in the input. For example, and without limitation, edges, textures and objects may be extracted from images, while word meanings, grammar and/or context may be extracted from text such as electronic health records 140.

With continued references to FIG. 1, data associated with differing modalities 124 may be mapped into a shared embedding space 148. A "shared embedding space" for the purposes of this disclosure is a numerical space in which data associated with differing modalities is represented as vectors within the same numerical space. For example, and without limitation, ECG signals and ECG images 136 may be represented as vectors within the shared embedding space 148, wherein an individual and/or system may determine a relationship between the ECG images 136 and the ECG signals based on their closeness within the space. In one or more embodiments, data entries 128 may be converted into embeddings wherein embeddings may be represented within the shared numerical space. In one or more embodiments, embeddings may contain vectors wherein vectors may be situated closely to one another and/or further apart based on the information they represent. In one or more embodiments, a shared embeddings space may be used to map vectors and determine and/or find a relationship between vectors based on their distance. For example, and without limitation, an ECG signal 132 and a corresponding ECG image 136 of the ECG signal 132 may be mapped closer together within shared embedding space 148. In one or more embodiments, shared embedding space 148 may allow for the comparison of differing modalities 124 by converting all forms of data into a singular data format. In one or more embodiments, data entries 128 may be converted into vector representations such that data entries 128 from differing modalities 124 may be used simultaneously. In one or more embodiments, similar data associated with differing modalities 124 may share similar features within a shared embedding space 148. This may include, for example, similar waveforms. In one or more embodiments, shared embedding space 148 may be used to identify and/or capture relationships across differing modalities 124. In one or more embodiments. shared embedding space 148 may include a common numerical space where embeddings from different data types and/or modalities 124 can be aligned.

With continued reference to FIG. 1, in one or more embodiments, encoder 144 may be configured to identify and/or extract meaningful patterns and representations from various data entries 128 and/or modalities 124, such as but not limited to, ECG images 136, ECG signals, and electronic health records 140. In one or more embodiments, system may include more than one encoders wherein each encoder 144 is customized to handle a specific data type and is trained to produce embeddings that are not only descriptive of the input data but also aligned with embeddings from other modalities 124. In one or more embodiments, encoders may be designed to learn embeddings that reflect the underlying relationships between the different modalities 124. For example, and without limitation, encoders may be configured to learn embeddings that reflect the relationship between ECG image 136 data and ECG signals. In one or more embodiments, encoder 144 may include a neural network configured to extract meaningful features from data entries 128. In one or more embodiments, encoder 144 may include any machine learning model as described in this disclosure, wherein encoder 144 is configured to identify and/or extract meaningful features from data entries 128 for use in training machine learning models.

With continued reference to FIG. 1, encoder 144 may include an ECG image encoder 152. An "ECG image encoder" for the purposes of this disclosure is an encoder 144 configured to receive ECG images 136 as inputs and output embeddings associated with the ECG images 136. In one or more embodiments, ECG image encoder may include and/or be included in an image encoder. In one or more embodiments, an image encoder may be configured to encode images similar to that of ECG image encoder 152. In one or more embodiments, image encoder may be configured to encode images, such as but not limited to ultrasound images, ICE images, Electroencephalograms, transesophageal images, Intracardiac Electrophysiology images and/or any other images generated from any other medical images techniques. In one or more embodiments image encoder may be configured to encode images other than that of ECG images. In one or more embodiments, embeddings may include identified features such as but not limited to, patterns in lead configuration, patterns in grid layouts and/or the like. In one or more embodiments, ECG image encoder 152 may be configured to receive an ECG image 136 as an input and output identified patterns. In one or more embodiments, ECG image encoder 152 may include a convolutional neural network. In one or more embodiments, ECG image encoder 152 may be configured to identify patterns, shapes and/or trends within an ECG image 136. In one or more embodiments, ECG image encoder 152 may detect visual patterns such as waveforms or gridlines and output embeddings that represents the waveforms or gridlines. In one or more embodiments, ECG image encoder 152 may be configured to output embeddings that represent clinically relevant features of the ECG image 136.

With continued reference to FIG. 1, ECG image encoder 152 may include a machine learning model trained and/or pretrained to identify features and representations within ECG images 136. In one or more embodiments, ECG image encoder 152 may be trained by generating synthetic ECG images. In one or more embodiments, synthetic ECG images may be generated by converting raw ECG signals into images of printed ECG with various layout formats. The generation process may include variations in the number of rhythm strips, the presence or absence of reference signals, the order of ECG leads, and variations in the background grid style. This ensures that the generated ECG image 136 may cover all possible variations of printed ECGs used in clinical practice. In one or more embodiments, ECG image encoder 152 may include a convolutional neural network configured to encode an image into a numerical representation. In one or more embodiments, ECG image encoder 152 may be trained in any way as described in this disclosure.

With continued reference to FIG. 1, processor 108 may be configured to generate ECG visual data 156 as a function of ECG data. "ECG visual data" for the purposes of this disclosure is a computer-generated graphical representation of the electrocardiogram signals recorded within ECG data. For example, and without limitation, ECG visual data 156 may include a two dimensional X-Y chart wherein electrocardiogram signals are plotted over a given time. In one or more embodiments, ECG signals may be plotted along a vertical axis whereas corresponding time variables may be plotted along a horizontal axis. In one or more embodiments, ECG visual data 156 may include computer-generated images of plotted ECG signals and corresponding time variables. In one or more embodiments, each ECG set may be plotted individually. In one or more embodiments, multiple ECG sets associated with the same individual may be plotted on a singular chart or graph. In one or more embodiments, processor 108 may be configured to receive ECG data and generate ECG visual data 156. In one or more embodiments, processor 108 may be configured to generate a graphical representation of each ECG signal 132 and/or set of ECG signals. In one or more embodiments, graphical representation may include an ECG waveform wherein the waveform includes a graphical representation of ECG data. In one or more embodiments, Time may be shown along a horizontal and/or X axis while ECG signals (i.e. voltage) may be shown along the vertical and/or Y axis.

With continued reference to FIG. 1, processor 108 may be configured to generate synthetic images 160 from ECG signals 132, ECG images 136 and/or ECG visual data 156. In one or more embodiments, synthetic images 160 may be generated in various layouts, wherein multiple ECG sets associated with the same patient may be placed within a single synthetic image 160. A "synthetic image" for the purposes of this disclosure is a computer-generated image of ECG signals configured to replicate a paper printout of ECG signals received from on or more ECG devices. For example, without limitation synthetic image may include an image of what a paper printout from an ECG device may look like. This may include but is not limited to, black and white images, images with specific size layout formats, images with specific grid layout formats to that of an ECG device and/or the like. In one or more embodiments, ECG devices, may include, but are not limited to, resting ECG machines, portable or handheld ECG devices, Holter monitors, event monitors, stress test ECG devices, implantable loop devices and/or the like. In one or more embodiments, each ECG device may generate paper printouts of ECG signals recoded. In one or more embodiments, Synthetic image may include replicated printouts of the ECG devices. In one or more embodiments, synthetic image may differ in size, format, color and/or the like in order to replicate differing ECG devices and/or differing sources of ECG images. In one or more embodiments, the generation process may include variations in the number of rhythm strips, the presence or absence of reference signals, the order of ECG leads, and variations in the background grid style. This may ensures that the generated ECG image covers all possible variations of printed ECGs used in clinical practice. In one or more embodiments, processor 108 may use software configured for plotting, such as Matlab, Plotly, Seaborn, Bokeh and the like. In one or more embodiments, synthetic images 160 may be generated in varying layout formats wherein each layout format may contain differing sets of ECG signals. In one or more embodiments, layout formats may include but are not limited 3×4 (3 leads placed across four rows), 3×4 with 1 Rhythm lead (3 leads placed across 4 rows with one additional lead dedicated to displaying rhythm), 6×2 (6 leads placed across two rows), 6×2 with 1 Rhythm lead (6 leads placed across two rows with 1 rhythm lead), 12×1, 3×4 with 2 rhythm leads, 3×4 with 3 rhythm leads (3 leads placed across 4 rows with three rhythm leads), Pan12 layout and the like. In one or more embodiments, multiple leads and multiple rows may be placed within the same synthetic image 160. In one or more embodiments, synthetic images 160 may contain differing layouts but similar quality, color contrast, and the like. In one or more embodiments, synthetic images 160 may further contain differing settings for generating graphical representation of ECG signals. In one or more embodiments, differing settings may include but are not limited to, paper speeds of 25 mm/s or 50 mm/s, with limb lead scale of 2.5 mm/mV, 5 mm/mV, 10 mm/mV, 20 mm/mV, with full scale chest leads and half scale chest leads. Time sequential versus Simultaneous, Standard and Cabrera format and the like. In one or more embodiments differing settings may further include with reference signal at end, or with reference signal at start or no reference signal, with a separator between lead signals or without separator between lead signals and the like. In an embodiment, Graphical representations of ECG signals may differ with respect to layouts of the ECG signals, layouts of the rhythms, differing paper speeds and the like. In one or more embodiments, generating ECG visual data 156 may include plotting ECG data. In one or more embodiments, plurality of synthetic images 160 may include a plurality of images having differing formats as described above. In one or more embodiments, differing layout formats may further include the use of standard grids, modified grids, no grids at all, 12-lead formats, reduced lead formats, standard medical paper sizes, compact printer, continuous strips, snapshots, the use of waveform labels, the inclusion of measurement data such as PR, QRS, QT and amplitudes, and/or the like.

In one or more embodiments, synthetic images 160 generated by processor 108 may be printed in a physical form through a variety of printers and rescanned through one or more inputs devices back into a digitized form. In one or more embodiments, physical prints may be rescanned using inputs devices such as but not limited to, mobile phone cameras, scanners with differing qualities and DPIs, stand-alone cameras, taking a screenshot from a screen, taking a screenshot from a photo, Taking a screenshot of an ECG signal 132 in an ECG viewer software and the like. In one or more embodiments, processor 108 may be configured to simulate a process of printing synthetic images 160 and rescanning them. In one or more embodiments, processor 108 may be configured to simulate printing and scanning processes by adjusting the resolution of images, adjusting the DPI of images, adjusting the brightness of images, varying the color of images, varying the format of various images, simulating paper creases similar to that in a scanned image, simulating light obstructions in the images and the like. In one or more embodiments, processor 108 may generate ECG image 136 data by receiving ECG visual data 156 and simulating one or more processes of printing and scanning a synthetic image 160 within ECG visual data 156.

With continued reference to FIG. 1, ECG visual data 156 may further include augmented images 164. An "augmented image" for the purposes of this disclosure refers to a synthetic image 160 that has been modified. For example, and without limitation, augmented image 164 may include an image in which the color has been distorted, the image has been cropped, portions of the image may be missing and/or the like. In one or more embodiments, processor 108 may be configured to generate synthetic images 160 of ECG signals and augmented the images to account for real world conditions in which images may be augmented and/or distorted during scanning. In one or more embodiments, an augmented may include a synthetic image 160 that has been modified from its original form in order to distort the data presented within the image. This may include for example, distortion of color, distortion of size ratios, distortion of picture quality, distortion by rotating the image and/or the like. In one or more embodiments, processor 108 may be configured to generate ECG visual data 156 from ECG signals. In one or more embodiments, ECG visual data 156 may include synthetic images 160. In one or more embodiments, ECG visual data 156 may include augmented images 164.

With continued reference to FIG. 1, synthetic images 160 and ECG images 136 may be used to train ECG image encoder 152. In one or more embodiments, to simulate real-world variations in ECG image 136 quality (such as variations in capture conditions or scanning artifacts), several augmentations may be applied to ECG images 136 and/or synthetic images 160. These augmentations may include Gaussian noise, Salt and pepper noise, Blurring, Speckle noise, Rotation, Paper crumbling (simulating a worn document), Creasing, Shadow effects (simulating lighting conditions), Perspective transformation (simulating camera distortion), etc. These augmentations may ensure that the generated ECG images 136 capture a wide range of real-world conditions. In one or more embodiments, real-world conditions may result in distorted images, images that have been inadvertently cropped, images with poor color quality, images with various distortions in size and shape, images containing blotches that block out portions of the image and/or the like as described in this disclosure. In one or more embodiments, the generation of augmentation may be used to train a machine learning model to identify distortions and/or augmentations and understand that they are not relevant features with respect to data analyzation. In one or more embodiments, generation of augmented images may train a machine learning model to identify relevant features associated with ECG signals while ignoring augmentations, modifications and/or the like. In one or more embodiments, generation of augmented image may allow for a machine learning model to distinguish between relevant data (e.g. ECG signals) and irrelevant data (e.g. distortions).

With continued reference to FIG. 1, processor 108 may be configured to receive paired data. "Paired data" for the purposes of this disclosure is training data that may be used to train one or more machine learning models. In one or more embodiments, paired data may include inputs the machine learning model is expected to receive and outputs the machine learning model is configured to generate. Training data and machine learning models is described in further detail below. In one or more embodiments, paired data may include plurality of ECG images 136 correlated to a plurality of synthetic images 160 and/or ECG visual data 156. In one or more embodiments, paired data includes ECG visual data 156 and ECG image 136 data. In one or more embodiments, ECG visual data 156 and ECG image 136 data may be correlated wherein each ECG image 136 within ECG image 136 data may be correlated to each synthetic image 160 of ECG visual data 156. In one or more embodiments, ECG image 136 data may include inputs to the machine learning model and ECG visual data 156 may contain correlated outputs to the machine learning model. In one or more embodiments, paired data may include ECG image 136 data and correlated ECG visual data 156, wherein each ECG image 136 within ECG image 136 data may contain a correlated synthetic image 160. In an embodiment, each ECG image 136 may contain a set of ECG signals, wherein each synthetic image 160 may contain the same set of ECG signals in a standardized format. In one or more embodiments, each ECG image 136 and correlated synthetic image 160 may depict similar information yet differ in image quality, brightness and the like. In one or more embodiments, each ECG image 136 and correlated synthetic image 160 may contain similar settings and layouts with respect to the graphical representation of ECG signals yet vary in quality, format, and the like.

With continued reference to FIG. 1, paired data may include augmented images 164. In one or more embodiments, an augmented image 164 may include an image that has been altered from its original form such that a portion of the image is now masked or missing. For example, and without limitation, Augmented image 164 may include an image that has been cropped from its original size, an image that been split into two and the like. In one or more embodiments, paired data may include augmented images 164. In one or more embodiments, ECG images 136 within ECG image 136 data may be augmented wherein portions of ECG images 136 are obscured, removed and the like. In one or more embodiments, processor 108 may augment images within ECG image 136 data at random. In one or more embodiments, processor 108 may receive a set of correlated images from ECG image 136 data and ECG visual data 156 and augment the image within ECG image 136 data. In one or more embodiments, augmentation of images within paired data may allow for training of one or more machine learning models as described below. In one or more embodiments, paired data may include plurality of ECG images 136 correlated to plurality of synthetic images 160, wherein each ECG image 136 of plurality of ECG images 136 is correlated with each synthetic image 160 of plurality of synthetic images 160. In one or more embodiments, paired data may be received as described above. In one or more embodiments, paired data may further be received through user inputs, from a database 116 and the like.

With continued reference to FIG. 1, processor 108 may be configured to train ECG image 136 decoder as a function of paired data. In one or more embodiments, ECG image 136 decoder may receive images of ECG signals and transform the images into clear images adhering to a particular set of rules. For example, and without limitation, ECG image 136 decoder may be configured to receive an image of an ECG signal 132 that has been received from a scanning device and output or generate an in-silicon image. In one or more embodiments, ECG image 136 decoder may include a machine learning model configured to receive inputs such as ECG image 136 data and output ECG visual data 156. In one or more embodiments, ECG image 136 decoder may be configured to receive images varying from differing sources and transform the images to a similar format in comparison to one another. In one or more embodiments, computing device may include a machine learning module to implement one or more algorithms or generate one or more machine-learning models to generate outputs. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, user inputs and/or be provided by a user. In other embodiments, a machine-learning module may obtain a training set by querying a communicatively connected database 116 that includes past inputs and outputs. Training data may include inputs from various types of databases 116, resources, libraries, dependencies and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module may be used to create a machine learning model and/or any other machine learning model using training data. Training data may be data sets that have already been converted from raw data whether manually, by machine, or any other method. In some cases, the machine learning model may be trained based on user input. For example, a user may indicate that information that has been output is inaccurate wherein the machine learning model may be trained as a function of the user input. In some cases, the machine learning model may allow for improvements to computing device such as but not limited to improvements relating to comparing data items, the ability to sort efficiently, an increase in accuracy of analytical methods and the like.

With continued reference to FIG. 1, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database 116, and/or be provided by a user. In other embodiments, machine-learning module may obtain a training set by querying a communicatively connected database 116 that includes past inputs and outputs. Training data may include inputs from various types of databases 116, resources, libraries, dependencies and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. In one or more embodiments, ECG image 136 decoder may include a machine learning model configured to receive inputs similar to that of ECG image 136 data and output synthetic images 160 similar to that of ECG visual data 156.

With continued reference to FIG. 1, paired data may be used to train ECG image 136 decoder. In one or more embodiments, paired data may include ECG image 136 data correlated to ECG visual data 156. In one or more embodiments, paired data may be used to train ECG image 136 decoder wherein ECG image 136 decoder may be configured to receive inputs and generate outputs in a standardized format.

With continued reference to FIG. 1, training ECG image 136 decoder may include a process in which ECG image 136 decoder and/or processor 108 may predict synthetic images 160 and/or ECG visual data 156 from ECG image 136 data. For example, and without limitation, ECG image 136 decoder may receive an ECG image 136 from without ECG image 136 data and predict the correlating synthetic image 160. In one or more embodiments ECG image 136 decoder may compare predictions to the actual information contained within ECG visual data 156. In one or more embodiments, ECG image 136 decoder may be configured to receive ECG image 136 data and/or portions thereof wherein ECG image 136 decoder may be tasked with predicting correlated synthetic images 160. In one or more embodiments, ECG image 136 decoder may be configured with a pretext task. In one or more embodiments, the pretext task may include predicting and/or finding synthetic images 160. In one or more embodiments, ECG image 136 decoder may extract relevant features from ECG image 136 data in order to predict ECG visual data 156. In one or more embodiments, ECG image 136 decoder may contain a predetermined set of values of parameters wherein the parameters refer to weights and biases. In one or more embodiments, parameters may be initialized randomly or received from similar machine learning models. In one or more embodiments, during training, parameters of ECG image 136 decoder may be given initial values wherein the parameters may change in order to fine tune machine learning model for a specific purpose. In one or more embodiments, training involves modifying parameters based on the input data and correlated output data in order to learn meaningful representations or features that can be further refined further on in order fine tune ECG image 136 decoder. In one or more embodiments, ECG image 136 decoder may receive as an input ECG image 136 data and predict visual data. In one or more embodiments, ECG image 136 decoder may compare predictions of ECG visual data 156 to actual ECG visual data 156. In one or more embodiments, ECG image 136 decoder may utilize a loss function in order to measure the discrepancy between predicted outputs of ECG image 136 decoder and the actual outputs. In one or more embodiments, ECG image 136 decoder may adjust parameters iteratively through optimization techniques such as but not limited to gradient descent to minimize the discrepancy.

In one or more embodiments, a machine learning model such as ECG image 136 decoder may contain parameter values 168. "Parameter values" for the purposes of this disclosure are internal variables that a machine learning model has generated from training data in order to make predictions. In one or more embodiments, parameter values 168 may be adjusted during pretraining or training in order to minimize a loss function. In one or more embodiments, during training, predicted outputs of the machine learning model are compared to actual outputs wherein the discrepancy between predicted output and actual outputs are measured in order to minimize a loss function. A loss function also known as an "error function" may measure the difference between predicted outputs and actual outputs in order to improve the performance of the machine learning model. A loss function may quantify the error margin between a predicted output and an actual output wherein the error margin may be sought to be minimized during the training process. The loss function may allow for minimization of discrepancies between predicted outputs and actual outputs of the machine learning model. In one or more embodiments, the loss function may adjust parameter values 168 of the machine learning model. In one or more embodiments, in a linear regression model, parameter values 168 may include coefficients assigned to each feature and the bias term. In one or more embodiments, in a neural network, parameter values 168 may include weights and biases associated with the connection between neurons or nodes within layers of the network. In one or more embodiments, during pretraining and/or training of the machine learning model, parameter values 168 of the machine learning model (e.g. ECG image 136 decoder) may be adjusted as a function of at least one predicted synthetic image 160 within ECG visual data 156 and the actual synthetic image 160. In one or more embodiments, processor 108 may be configured to minimize a loss function by adjusting parameter values 168 of ECG image 136 decoder based on discrepancies between predicted outputs and actual outputs as indicated with ECG visual data 156. In one or more embodiments, training ECG image 136 decoder may include adjusting one or more parameter values 168 of ECG image 136 decoder as a function of a comparison between at least one predicted synthetic image 160 and at least one synthetic image 160 of the plurality of synthetic images 160 within ECG visual data 156. In one or more embodiments, processor 108 may be configured to iteratively train ECG image 136 decoder, wherein processor 108 may be configured to iteratively receive ECG signals from patients, paired data and/or the like and adjust parameter values 168 of ECG image 136 decoder. In an embodiment, the more ECG data and/or paired data received by ECG image 136 decoder, the more accurate the ECG image 136 decoder may be in predicting synthetic images 160. In one or more embodiments, parameter values 168 may correspond to learned features of paired data such as waveforms, patterns, frequencies and the like.

With continued reference to FIG. 1, processor 108 may be configured to receive non-conforming data. In one or more embodiments, processor 108 may be configured to receive non-conforming data for use in ECG image 136 decoder. "Non-conforming data" for the purposes of this disclosure refers to images of ECG signals associated with patients that do not conform to a predetermined set of rules or standards. In an embodiment, non-conforming data may include images similar to that of ECG images 136. In an embodiment, ECG images 136 may be used to train ECG image 136 decoder whereas non-conforming data may be used to receive images which have been standardized. In one or more embodiments, non-conforming data may include images of ECG signals received from mobile devices, printouts, scanned physical documents, and the like. In one or more embodiments, non-conforming data may include images that have varying quality, varying orientations, differing color contrast, differing dots per inch and the like. In one or more embodiments, non-conforming data may contain issues with light reflections, exposure issues, and the like. In one or more embodiments, non-conforming data may include images that have been unintentionally cropped or are missing portions of the image. In one or more embodiments, non-conforming data may include ECG images 136 that have not been used for training of ECG image 136 decoder. In one or more embodiments, non-conforming data may be received from a user of system, by querying database 116 and the like. In one or more embodiments, non-conforming data may be received by a web crawler. A "web crawler," as used herein, is a program that systematically browses the internet for the purpose of web indexing. Web crawler may be seeded with platform URLs, wherein the crawler may then visit the next related URL, retrieve the content, index the content, and/or measures the relevance of the content to the topic of interest. In some embodiments, computing device may generate a web crawler to compile and/or generate a plurality of requirements and/or elements thereof. The web crawler may be seeded and/or trained with a reputable website, such as governmental websites, medical websites, research websites associated with medical research and the like. Web crawler may be generated by computing device. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract any data suitable for the plurality of requirements. In one or more embodiments, non-conforming data may be received iteratively by a web crawler. In one or more embodiments, the larger the amount of data received, the more accurate a machine learning model may be as described in further detail below. In one or more embodiments, processor 108 may be configured to iteratively and/or periodically configure web crawler to retrieve non-conforming data wherein non-conforming data may be fed to ECG image 136 decoder.

With continued reference to FIG. 1, ECG image 136 decoder may be configured to output standardized data as a function of non-conforming data. "Standardized data" for the purposes of this disclosure is a data set containing synthetic images 160. In an embodiment, ECG image 136 decoder may be configured to receive non-conforming data wherein images within non-conforming data may be converted to a particular standardized format. In one or more embodiments, Standardized data may contain in-silicon quality images generated from images within non-conforming data. In one or more embodiments, ECG image 136 decoder may output a computer-generated image adhering to a particular set of rules or standards for each image within conforming data. In one or more embodiments, ECG image 136 decoder may be configured to generate standardized data wherein the images within standardized data may be similar to images within ECG visual data 156. In one or more embodiments, following training, ECG image 136 decoder may be configured to generate standardized data.

With continued reference to FIG. 1, standardized data may be used as and/or include unlabeled training data 188. "Unlabeled training data 188" for the purposes of this disclosure is data that lacks distinct elements or classifiers that can be used to train a machine learning model. In an embodiment, unlabeled training data 188 may include data that has not been classified by an individual or computing system. In one or more embodiments, "labeled training data 188" may refer to data that has been labeled and configured to training machine learning models. in an embodiment, labeled training data 188 may include training data with inputs and correlated outputs. In an embodiment, paired data may include labeled training data 188 wherein paired data includes inputs such as ECG images 136 data and correlated outputs such as ECG visual data 156. In an embodiment, unlabeled training data 188 may include data that has not been modified to train machine learning models. In one or more embodiments, unlabeled training data 188 may include data that may be used for training of one or more machine learning models but has not been specifically modified for the training of one or more machine learning models. In one or more embodiments, unlabeled training data 188 may lack tags, labels, classifications, correlated outputs and the like. In one or more embodiments, standardized data may contain unlabeled training data 188. In one or more embodiments, Standardized data may include any training data as described in this disclosure. In one or more embodiments, standardized training data may become iteratively larger following each iteration of the processing. In one or more embodiments, standardized data may become iteratively larger through additional non-conforming data received through web crawlers, user input and the like.

With continued reference to FIG. 1, standardized data may be used for multiple downstream tasks. As used in this disclosure downstream tasks may refer to machine learning models that utilize ECG signals for differing purposes Multiple downstream task models may be trained using ECG images 136/extracted ECG signal 132 from images. In one or more embodiments, Downstream task models may utilize standardized data to train or pretrain the machine learning models for differing purposes. The downstream models may include convolutional neural networks or transformer neural networks trained to perform specific downstream tasks. In one or more embodiments, downstream tasks may include Disease prediction wherein a Classification model nay be used to classify signals to diseases.

Downstream tasks may further include parameter extraction wherein a regression model may be used to predict the ECG parameters like PR interval, ventricular rate, QT interval and the like. IN one or more embodiments, downstream tasks may further include ECG delineation wherein a segmentation model may be configured to segment ECG signals into P, QRS, T, U waves and the like. In one or more embodiments, downstream tasks may further include ECG rhythm and abnormalities predictions wherein Multiclass classification models are to predict various abnormalities in ECG like rhythm/rhythm abnormalities, conduction abnormalities, morphological abnormalities and the like. In one or more embodiments, downstream tasks may further include ECG text report generation, wherein Auto-regressive models are configured to generate ECG text reports. In one or more embodiments, downstream tasks may further include monitoring applications wherein the focus may shift from a single ECG to tracking changes over time. By comparing paired ECGs from the same patient, the system can identify trends that might signal developing heart problems. In one or more embodiments, downstream tasks may further include advanced parameter prediction machine learning models can estimate various heart-related parameters, including, but not limited to, Ejection Fraction (EF): Measures heart pumping efficiency, Left Ventricular Mass Index (LVMI): Indicates heart muscle thickness, Filling Pressures: Pressure within heart chambers before contraction, Chamber Volumes and Surface Areas: Estimates of heart chamber sizes, Number of Pulmonary Veins (PVs): Detects abnormalities in blood vessels from lungs to the heart, Valve and Vessel Dimensions: Assesses size and function of heart valves and major blood vessels, Vascular Pressures: Estimates pressure within blood vessels and the like. In one or more embodiments, downstream tasks may further include monitoring mechanical and anatomical parameters of the heart through the use of ECG images 136, such as standardized data. In one or more embodiments, parameters include may include aortic valve diameter, number of pulmonary veins (PVs), and volumetric measurements of chambers (e.g., surface area and volume). In one or more, ECG machine learning model 184 may be configured to perform one or more downstream tasks as described above. In one or more embodiments, ECG machine learning model 184 may be configured to determine similarities and differences between two sets of ECG signals. For example, and without limitation ECG machine learning model 184 may be configured to identify similarities and/or differences between two particular sets of ECG signals such as but not limited to, changes in waveform, changes in amplitude and the like.

With continued reference to FIG. 1, ECG image encoder 152 may be trained to identify relevant features and/or representations within ECG image 136 data. In one or more embodiments, ECG image 136 decoder may be trained using paired data. In one or more embodiments, ECG visual data 156 may allow for ECG image 136 decoder to learn what features are relevant within ECG image 136 data. In one or more embodiments, ECG visual data 156 may be used to distinguish between relevant values within ECG images 136 and various noise and/or image distortions. In one or more embodiments, processor 108 may be configured to generate ECG visual data 156 from ECG signals and train ECG image encoder 152. In one or more embodiments, ECG image encoder 152 may be trained in anyway as described in U.S. Nonprovisional application Ser. No. 18/641,217 filed on Apr. 19, 2024 and entitled "SYSTEMS AND METHODS FOR TRANSFORMING ELECTROCARDIOGRAM IMAGES FOR USE IN ONE OR MORE MACHINE LEARNING MODELS" and the entirety of which is incorporated herein by reference.

With continued reference to FIG. 1, system 100 may include an ECG signal 132 encoder 144. An "ECG signal encoder" for the purposes of this disclosure is an encoder 144 configured to receive ECG signals and generate an embedding that represents key features of the ECG signal 132. In one or more embodiments, ECG signal encoder may process raw ECG signals, such as time series data. In one or more embodiments, ECG signal encoder may extract temporal and frequency-domain features from raw signals. In one or more embodiments, ECG signal encoder may produce embeddings that represent physiological properties of the ECG signal 132. In one or more embodiments, ECG signal encoder may include machine learning models such as but not limited to recurrent neural networks, convolutional neural networks, and/or the like. In one or more embodiments, ECG signal encoder may generate embeddings which may then be mapped into shared embedding space 148. In one or more embodiments, system 100 may include an EHR encoder 144. An "EHR encoder" for the purposes of this disclosure is an encoder 144 configured to receive electronic health records 140 and generate an embedding that reflects the clinical context provided by the electronic health records 140. For examples, and without limitation, HER encoder 144 may be configured to process clinical data, such as demographics, medical history, diagnoses and/or the like. In one or more embodiments, EHR encoder may be configured to extract clinically relevant data such as, for example, diagnoses, weight, medical history, medications take and/or the like. In one or more embodiments, EHR encoder may be configured to generate embeddings that encapsulate clinically relevant features, such as for example, diagnoses, medical history and/or the like.

With continued reference to FIG. 1, each encoder 144, (e.g. ECG image encoder 152, ECG signal encoder, EHR encoder etc.) may be configured to produce embeddings of data entries 128. In one or more embodiments, each encoder 144 may be configured for their respective modality 124, wherein for example, ECG image encoder 152 may be configured to ECG images 136. In one or more embodiments, encoders as described herein may be configured to produce embeddings for each data entry 128. In one or more embodiments, each encoder 144 as described herein may generate numerical representations for each data entry 128 to be mapped into shared embedding space 148. In one or more embodiments, processor 108 may be configured to receive one or more data encoders and encode data entries 128 based on their respective modality 124. For example, and without limitation, an ECG image 136 may be decoded using an ECG image encoder 152, whereas an ECG signal 132 may be encoded using an ECG signal encoder. In one or more embodiments, processor 108 may be configured to receive one or more data encoders, wherein each data encoder 144 of the one or more data encoders is associated with a differing modality 124 of the one or more modalities 124. In one or more embodiments, processor 108 may then be configured to encode each data entry 128 of the plurality of entry as a function of the one or more modalities 124.

With continued reference to FIG. 1, processor 108 is configured to generate an encoded multimodal dataset 172. An "Encoded multimodal dataset" for the purposes of this disclosure refers to a multimodal dataset 120 that has been encoded using one or more encoders as described in this disclosure. In one or more embodiments, encoder 144 multimodal dataset 120 may include a plurality of embeddings wherein each embedding correlates to a given data entry 128. In one or more embodiments, data entries 128 may be input into one or more encoders wherein outputs of the encoders may include embedding. In one or more embodiments, encoded multimodal dataset 172 may include encoded modalities 176. An "encoded modality 176" for the purposes of this disclosure refers to a category of information that has been encoded. For example, and without limitation, encoded modality 176 may refer to ECG images 136 that have been encoded to create embeddings. In one or more embodiments, encoded modalities 176 may include ECG signals, ECG images 136, electronic health records 140 and/or the like. In one or more embodiments, encoded multimodal dataset 172 may include an output of a multimodal dataset 120 that has been input into one or more encoders. In one or more embodiments, each encode modality 124 may refer to a particular modality 124 within multimodal dataset 120. In one or more embodiments, encoded multimodal dataset 172 may include information within a same or similar format. In one or more embodiments, encoded multimodal dataset 172 may include embeddings that have similar or the same data formats. For example, and without limitation, an ECG signal 132 and an ECG image 136 within multimodal dataset 120 may both be encoded into an embedding having the same data format. In one or more embodiments, embeddings may include numerical representations of the data entries 128 within multimodal dataset 120. In one or more embodiments, encoded modalities 176 may include numerical representations of the modalities 124 within multimodal dataset 120.

With continued reference to FIG. 1, processor 108 is configured to map encoded multimodal dataset 172 to shared embedding space 148. In one or more embodiments, multimodal dataset 120 may include a plurality of embeddings wherein each embedding is mapped into shared embedding space 148. In one or more embodiments, embeddings may include vectors which may be mapped to shared embedding space 148. In one or more embodiments, data from differing modalities 124 may be represented as vectors within shared embedding space 148. In one or more embodiments, data within shared embedding space 148 may allow a machine learning model to utilize relationships between vectors situated close to one another within shared embedding space 148. In one or more embodiments, shared embedding space 148 may allow for a machine learning model to understand similarities between differing modalities 124. For example, and without limitation, an ECG signal 132 and corresponding ECG images 136 may be mapped within the same relative positions due to the similarity in the data they represent. In one or more embodiments, one or more machine learning models as described in this disclosure may use shared embedding space 148 to identify similarities between embeddings. In one or more embodiments, shared embedding space 148 may allow a machine learning model to identify similarities between differing modalities 124.

With continued reference to FIG. 1, processor 108 may be configured to align similar data points and/or embeddings within shared embedding space 148 through supervised, self-supervised and/or unsupervised methods. A "supervised" machine learning process as described herein refers to a machine learning process in which data is explicitly labeled. For example, and without limitation, multimodal data set 120 may contain data points having a label indicating the patient to which they belong to, a label indicating corresponding pairs within differing modalities, label indicating various embedded pairs and/or the like. This will be described in further detail below. A "self-supervised" machine learning process, as described in this disclosure, is a machine learning process where a model is trained on a task using the data itself, rather than relying on externally-provided labels for the data. For example, and without limitation, data points corresponding from the same source may be labeled as such. Similarly, augmentations of data points may be labeled as being similar to that of the original data point. In one or more embodiments, in a self-supervised process, data points such as ECG signals 132, ECG images and/or the like may be labeled based on the source of their data. For example, and without limitation, data associated with the same patient may be labeled as such. In one or more embodiments, in a self-supervised machine learning process, processor 108 may be configured to generate augmentations of data points and align the original data points and the augmentations together. This will allow for the machine learning model to identify features associated with the data being represented (e.g. the ECG signal) and ignore noise and/or other information that is not pertinent to the data (e.g. noise in images, data format, color, etc.) this will be described in further detail below. A "unsupervised" machine learning process as described herein refers to a machine learning process in which data points are not labeled but rather grouped or aligned based on their identified features. For example and without limitation, an ECG image and an ECG signal may be aligned because they share similar identified waveforms, peaks and/or the like. This will be described in further detail below.

With continued reference to FIG. 1, in one or more embodiments, in a supervised learning approach, data may be labeled to explicitly guide the alignment of embeddings. In one or more embodiments, embedded pairs may be labeled to indicate their similarity. For example, and without limitation, Embedded pairs 180 may indicate that an ECG signal 132 and corresponding ECG image 136 contain the same or similar information but in a different format. In one or more embodiments, supervised machine learning methods may allow for processor 108 to iteratively train encoders and/or any other machine learning models as described herein to align ECG signals 132 and ECG images 136 within the same embedded pair 180. In one or more embodiments, a supervised loss function such as cross-entropy loss or contrastive loss may be used to align the similar embeddings. In one or more embodiments, for the positive pairs (i.e. data within the same embedded pair), the loss function may minimize the distance between the embeddings. In one or more embodiments, for negative pairs (i.e. data from differing embedded pairs), the loss function may maximize the distance between embeddings. In one or more embodiments, clear and direct labeling of data points may allow for increased accuracy in aligning embeddings. In one or more embodiments, the labeling of embeddings may allow for more task specific purposes, wherein one or more machine learning models described herein may be trained to identify algin medical conditions with specific ECG signals.

With continued reference to FIG. 1, in a self-supervised machine learning process, data points from the same source or derived from one another may be treated as similar. For example, and without limitation, data points from the same patient (e.g. ECG signals, ECG images and electronic health records) may be treated as similar and labeled as such. In one or more embodiments, in a self-supervised process, data from the same source may be treated as positive pairs, while data from differing sources may be treated as negative pairs. In one or more embodiments, contrastive loss may be used to align embeddings without the use of explicit labels. In one or more embodiments in a self-supervised process, augmented versions of the same data may be generated, wherein augmented versions of the same data may be treated as positive pairs while negative pairs may be pushed further apart. In an embodiments, in a self-supervised process, augmented versions of the same data may allow for a machine learning model to identify relevant features that may coincide with relevant features from differing modalities having the same data. For example, and without limitation, augmented images may be aligned, wherein only features associated with the ECGF signals may be identified. As a result, an ECG signal may, as a result, have a similar embedding since the encoder identified relevant features in the ECG signal. In one or more embodiments, in a self-supervised process, augmentations of each data point may be created, wherein embeddings of the augmented data points may be aligned. As a result, data associated with the same patient may be consequently aligned as well as the machine learning model is iteratively trained to focus on the data and not noise or the underlying images. In one or more embodiments, data augmentation may encourage the model to focus in invariant features and thus ensure that embeddings from differing modalities having similar data become aligned. In one or more embodiments, a self-supervised process may allow for large data sets, such as multimodal data set to be used without the need to label data.

With continued reference to FIG. 1, in an unsupervised learning process, no labels or explicit pairings are used. Instead, processor and/or a machine learning model may identify patterns and align embeddings based on their inherent structure. In one or more embodiments, in multimodal settings, embeddings can be aligned by maximizing mutual information between data points from differing modalities 124. For example, and without limitation, an encoder may be trained to reconstruct the ECG signal from its corresponding ECG image. The encoder may then learn to produce similar embeddings for the two modalities because the encoder forces them to represent the same information. In one or more embodiments, autoencoders may be used to compress and reconstruct data, thereby aligning similar embedding as a result. In one or more embodiments, clustering algorithms may be used to align similar embedding based on identified similarities. In one or more embodiments, in an unsupervised process, a machine learning model may be tasked to identify similarities strictly across differing modalities only to ensure that two data points from the same modality are not identified as similar. For example, and without limitation, the machine learning model may be tasked with identifying a similar ECG image to that of an ECG signal and not tasked to identify a similar second ECG image to that of a first ECG image. IN one or more embodiments, processor may be configured to identify matching pairs across differing modalities and align embeddings based on identified similarities.

With continued reference to FIG. 1, in one or more embodiments, processor 108 may be configured to modify values of embeddings to align similar embeddings. For example and without limitation, ECG signals and corresponding ECG images 136 may be brought closer together. In one or more embodiments, embeddings may include numerical vectors which may be iteratively adjusted in order to align similar embeddings closer together. In one or more embodiments, generation of embeddings may be random or initialized based on heuristic methods as described herein. In one or more embodiments, processor 108 may be configured to determine the Euclidean distance and/or cosine similarity between two embeddings within shared embeddings space. In one or more embodiments, processor 108 may utilize a loss function such as any loss function as described herein to determine whether similar embeddings are correctly placed based on their distance. In one or more embodiments, processor 108 may be configured to identify positive pairs, wherein positive pairs include related data entries 128. In one or more embodiments, positive pairs may include information associated with the same patient, ECG signals in differing formats and/or the like. In one or more embodiments, processor 108 may be configured to further identify negative pairs. In one or more embodiments, negative pairs may include unrelated data points, such as for example, data from differing patients, differing ECG signals and/or the like. In one or more embodiments, processor 108 may utilize loss function to calculate gradients indicating the direction which embeddings should move to reduce loss. In one or more embodiments, processor 108 may be used optimization algorithms such as stochastic gradient descent (SGD). In one or more embodiments, processor 108 may utilize a contrastive loss function minimize the distance between embeddings of matching pairs (same ECG image 136, same ECG signal 132, same EHR data) and maximize the distance between mismatched pairs. This encourages the network to learn a shared space where clinically relevant features from the ECG signal 132 and EHR data are reflected in the ECG image 136 embedding. In one or more embodiments, processor 108 may be configured to move positive pairs closer together within shared embedding space 148, while pushing negative pairs further apart. In one or more embodiments, processor 108 may be configured to iteratively refine embeddings such that similar data entries 128 and/or positive pairs are mapped closer together. In one or more embodiments, mapping data into shared embedding space 148 allows different formats of the same information contain similar embeddings even with noise or format changes. In one or more embodiments, aligning similar embeddings may allow for a machine learning model to generate similar outputs in instances in which similar data was captured. In one or more embodiments, processor 108 may be configured to map embeddings to shared embedding space 148 and minimize a loss between similar embeddings within shared embedding space 148. In one or more embodiments, aligning similar data entries 128 will allow for a machine learning model to generate similar outputs for inputs received in differing formats.

With continued reference to FIG. 1, processor 108 may be configured to identify embedded pairs 180 within encoded modalities 176 and/or within encoded multimodal dataset 172. An "embedded pair" for the purposes of this disclosure refers to a grouping of two or more data entries belonging to the same patient. For example, and without limitation, embedded pair 180 may include an ECG signal 132 and an ECG image 136 representing a paper printout of the ECG signal 132. In one or more embodiments, Embedded pair 180 may include all data entries 128 and/or embeddings belonging to the same patient. In one or more embodiments, embedded pair 180 may include data associated with each modality 124 and/or encoded modality 176. In one or more embodiments, a patient may have associated information within each modality 124. In one or more embodiments, embedded pairs 180 may include any and/or all information associated with the same patient. In one or more embodiments, data entries 128 may be expressly labeled as to which patient they belong to. In one or more embodiments, data entries 128 belonging to the same individual may be expressly labeled as so. In one or more embodiments, each data entry 128 may contain information indicating the patient to whom the data entry 128 is associated with. In one or more embodiments, each embedded pair 180 may include at least one ECG signal 132 from a plurality of ECG signals within multimodal dataset 120. Additionally or alternatively, each embedded pair 180 may include at least one ECG image 136 of plurality of ECG images 136 within multimodal dataset 120. Additionally or alternatively, each embedded pair 180 may include at least one electronic health record 140 of a plurality of electronic health records 140.

With continued reference to FIG. 1, processor 108 may be configured to map embeddings within shared embedding space 148. In one or more embodiments, processor 108 may be configured to identify embedded pairs 180. In one or more embodiments, processor 108 may label embedded pairs 180 as positive pairs for the purposes of contrastive learning. In one or more embodiments, processor 108 may be configured to minimize a loss between embedded pairs 180 to ensure they are mapped closer together within shared embedding space 148. In one or more embodiments, processor 108 may then be configured to map and/or remap embedded pairs 180 within shared embedding space 148. In one or more embodiments, embeddings not related through embedded pairs 180 may be viewed as negative pairs. In one or more embodiments, processor 108 may be configured to optimize only aspects of embeddings that are relevant for similarity or alignment while preserving the essential information contained within them. In one or more embodiments, processor 108 may use a loss function to make embeddings for similar data close together while maintaining enough variation to differentiate between two unrelated data. In one or more embodiments, processor 108 may be configured to utilize a loss function to ensure that embeddings contain enough information such that embedded pairs 180 are placed closer together while dissimilar data is differentiated and placed further apart. In one or more embodiments, only the projection within the shared space is adjusted while the core embedding is left intact.

With continued reference to FIG. 1, in one or more embodiments, processor 108 use may use contrastive loss functions to bring similar data points closer together. "Contrastive loss" as described in this disclosure is a type of loss function used in machine learning models to learn meaningful representations by encouraging similar data points to be close together in a shared embedding space 148. In one or more embodiments contrastive loss may further ensure that dissimilar data points are placed further Apart. In one or more embodiments, the loss function minimizes the distance between embeddings of two similar data points, such as embedded pairs. In one or more embodiments, embeddings for similar data points are brought closer together within the embedding space. In one or more embodiments, the loss function may penalize negative pairs and/or dissimilar embeddings wherein dissimilar embeddings and/or data entries 128 are placed further apart. In one or more embodiments, Contrastive loss is defined as:

$$L = y \cdot D^2 + (1-y) \cdot \max(0, m-D)^2$$

Where:
- $D = \|e_1 - e_2\|$ which is the distance between the two embeddings (e.g., Euclidean distance or cosine distance, wherein $e_1$ and $e_2$ are exemplary embeddings within encoded multimodal dataset 172.
- m is the margin that specifies the minimum allowable distance for negative pairs.
- $D^2$ is the squared distance, ensuring positive pairs are brought closer.
- $\max(0, m-D)^2$ Penalizes negative pairs only if their distance D is less than the margin m.

In one or more embodiments, for positive pairs such as embedded pairs 180, the loss function minimizes the distance D between embeddings. In one or more embodiments, for negative pairs, the loss function may minimize the distance D between embeddings. In one or more embodiments, the margin may ensure that negative pairs are not pushed too far apart. In one or more embodiments, the margin may specific the maximum distance in which the model no longer needs to increase the distance for dissimilar embeddings. In one or more embodiments, only parts of embeddings and/or vectors having similar clinically relevant features are adjusted in order to reduce the distance between the two embeddings.

With continued reference to FIG. 1, processor 108 may modifying a contrastive loss between encoded modalities 176 associated with the same patient of the plurality of patients. In one or more embodiments, processor 108 may be configured to compute a contrastive loss between embedded pairs 180 prior to training and modify contrastive loss during training to reduce a distance between embedded parts. In one or more embodiments, processor 108 may be configured to modify one or more parameters of one or more encoders as described in this disclosure to minimize a distance between embedded pairs 180 and increase distance between dissimilar data. In one or more embodiments, processor 108 may be configured to calculate a loss between similar data entries 128 such as embedded pairs and a loss between dissimilar data entries 128. In one or more embodiments, the loss may be used to train one or more encoders as described in this disclosure. In one or more embodiments, processor 108 may be configured to iteratively generate embeddings, map the embeddings into shared embedding space 148, calculate a loss and optimize one or more encoders to reduce a loss in subsequent generated embeddings. In one or more embodiments, encoders may be iteratively trained to reduce loss until embedded pairs 180 are aligned. In one or more embodiments, contrastive loss may be used to optimize encoders to generate similar embeddings for similar data entries 128. In one or more embodiments, processor 108 may be configured to iteratively train encoders as described herein to generate similar outputs for differing modalities 124. For example, and without limitation, processor 108 may be configured to train ECG image encoder 152 to generate similar embeddings for an ECG image 136 to that of an embedding generated for an associated ECG signal 132. In one or more embodiments, over multiple iterations may be configured to learn to map the features of similar data points to nearby locations in the embedding space while pushing unrelated data points apart. In one or more embodiments, parameter values 168 of one or more encoders as described in this disclosure may be iteratively adjusted in order to reduce a loss between embedded pairs 180. In one or more embodiments, encoders may learn new patterns and/or features that are common across all similar data. For example, and without limitation, encoders may be trained to identify the clinical relevance between ECG signals, ECG images 136 and electronic health records 140. In one or more embodiments, processor 108 may be configured to iteratively map embeddings output from one or more encoders, identify embedded pairs 180, compute a loss between embedded pairs 180 and dissimilar data points and iteratively train one or more encoders to minimize a loss between embedded pairs 180 while increasing a loss between dissimilar data points. In one or more embodiments, processor 108 may leverage contrastive learning techniques to map the relationships between ECG images 136, ECG signals, and EHR data into a shared embedding space 148. This enables the ECG image encoder 152 to learn clinically relevant and format agnostic feature representation, which can be used for downstream tasks.

With continued reference to FIG. 1, ECG image encoder 152 may be trained to generate embeddings based on similar to electronic health records 140 and ECG signals. In one or more embodiments, training ECG image encoder 152 using ECG signals and/or electronic health records 140 may allow for ECG image encoder 152 to distinguish between clinically relevant data and distortions within images. In one or more embodiments, ECG image encoder 152 may be configured to identify relevant features that have similarities to relevant features between correlated ECG signals and electronic health records 140. By randomly choosing different formats and augmentations, the encoder 144 learns a space where different image representations of the same ECG signal 132 result in similar embeddings. This enables the encoder 144 to handle real-world variations in ECG image 136 formats and quality, ensuring robustness in practical settings. In one or more embodiments, ECG image encoder 152 may be trained using both images and data from other formats to ensure that images with distortions and such may always produce the same or similar embeddings. In one or more embodiments, the contrastive learning approach ensures that the ECG image encoder 152 learns an embedding space where the clinical context (from ECG signals and EHR data) is integrated into the ECG image 136 features. This results in more clinically informed ECG image 136 representations, making them more useful for downstream applications like disease prediction, monitoring, and clinical decision support. In one or more embodiments, The ECG image encoder 152, once pretrained on a large dataset of ECG images 136, ECG signals, and EHR data, can be used directly (or fine-tuned) for any downstream task such as detecting arrhythmias, predicting heart conditions, or identifying patterns related to specific diseases, without requiring large amounts of labeled data for each new task.

With continued reference to FIG. 1, processor 108 is configured to pretrain an ECG machine learning model 184 as a function of the mapping of the embeddings and/or embedded pairs 180. An "ECG machine learning model" as described in this disclosure is a machine learning model configured to receive electrocardiogram signals as an input and output one or more relevant features useful in medical diagnostics. For example and without limitation, ECG machine learning model 184 may be configured to identify various waveforms and/or the like that may be associated with a heart condition. "Pretraining a machine learning model" as referred to herein refers to a computational process in which a machine learning model is trained on a large data set to learn general features or representation before fine tuning the machine learning model for a specific task. For example, and without limitation, pre-training ECG machine learning model 184 may include determining waveform patterns, heart rate variability, and other relevant characteristics of the ECG images 136. In one or more embodiments, pretraining ECG machine learning model 184 may allow for ECG machine learning model 184 to make determinations on unlabeled training data 188 such as but not limited to determination associated with edge detection, patterns and the like. In one or more embodiments, ECG machine learning model 184 may make determinations on ECG images 136, ECG images 136 and/or the like such as relevant features, patterns and the like wherein the determinations may be used as training data when fine tuning ECG machine learning model 184 for a particular cardiac related purpose. In one or more embodiments, pretraining a machine learning model may allow for a machine learning model to leverage general knowledge from a broad data set, such as multimodal dataset 120, in order to better generate outputs using a limited training data set. In one or more embodiments, pretraining ECG machine learning model 184 may allow for determinations of relevant features, patterns, and the like within multimodal dataset 120 prior to training ECG machine learning model 184 for a particular and/or specific use. In one or more embodiments, pretraining may allow for iterative training of ECG machine learning model 184 absent human input. In an embodiment, processor 108 may be configured to receive nonconforming data associated with patients, generate multimodal dataset 120, and pretrain ECG machine learning model 184 to determine relevant features, patterns and the like. In an embodiment, ECG machine learning model 184 may be pre-trained following receipt of multimodal dataset 120. In one or more embodiments, ECG machine learning model 184 may be iteratively trained with large data sets containing ECG signals, ECG images 136 and/or electronic health records 140. In one or more embodiments, pretraining ECG machine learning model 184 may include utilizing an unlabeled training data 188 set such as multimodal dataset 120 to generate its own labels based on the unlabeled training data 188 received.

With continued reference to FIG. 1, in one or more embodiments, a machine learning model such as ECG machine learning model 184 may contain parameter values 168 similar to that of ECG image encoder 152. In one or more embodiments, parameter values 168 may be adjusted during training or pretraining in order to minimize a loss function. In one or more embodiments, during training, predicted outputs of the machine learning model are compared to actual outputs wherein the discrepancy between predicted output and actual outputs are measured in order to minimize a loss function. A loss function also known an "error function" may measure the difference between predicted outputs and actual outputs in order to improve the performance of the machine learning model. A loss function may quantify the error margin between a predicted output and an actual output wherein the error margin may be sought to be minimized during the training process. The loss function may allow for minimization of discrepancies between predicted outputs and actual outputs of the machine learning model. In one or more embodiments, the loss function may adjust parameter values 168 of the machine learning model. In one or more embodiments, in a linear regression model, parameter values 168 may include coefficient assigned to each feature and the bias term. In one or more embodiments, in a neural network, parameter values 168 may include weights and biases associated with the connection between neurons or nodes within layers of the network. In one or more embodiments, during training and/or pretraining of the machine learning model, parameter values 168 of the machine learning model may be adjusted based on output of embeddings and correlated distances. In or more embodiments, processor 108 may be configured to minimize a loss function by adjusting parameter values 168 of ECG machine learning model 184 based on discrepancies between predicted outputs and actual outputs. In one or more embodiments, processor 108 may be configured to iteratively pretrain ECG machine learning model 184, wherein processor 108 may be configured to iteratively receive data entries 128 and adjust parameter values 168 of ECG machine learning model 184 based on generated embeddings.

With continued reference to FIG. 1, in one or more embodiments, ECG machine learning model 184 may be trained for downstream tasks associated with ECG signals. As used in this disclosure downstream tasks may refer to machine learning models that utilize ECG signals for differing purposes. Multiple downstream task models may be trained using trained encoders, such as ECG image encoder 152. In one or more embodiments, Downstream task models may utilize parameter values 168 of trained encoders to train or pretrain the machine learning models for differing purposes. The downstream models may include convolutional neural networks or transformer neural networks trained to perform specific downstream tasks. In one or more embodiments, downstream tasks may include Disease prediction wherein a Classification model nay be used to classify signals to diseases. Downstream tasks may further include parameter extraction wherein a regression model may be used to predict the ECG parameters like PR interval, ventricular rate, QT interval and the like. In one or more embodiments, downstream tasks may further include ECG delineation wherein a segmentation model may be configured to segment ECG signals into P, QRS, T, U waves and the like. In one or more embodiments, downstream tasks may further include ECG rhythm and abnormalities predictions wherein Multiclass classification models are to predict various abnormalities in ECG like rhythm/rhythm abnormalities, conduction abnormalities, morphological abnormalities and the like. In one or more embodiments, downstream tasks may further include ECG text report generation, wherein Auto-regressive models are configured to generate ECG text reports. In one or more embodiments, downstream tasks may further include monitoring applications wherein the focus may shift from a single ECG to tracking changes over time. By comparing paired ECGs from the same patient, the system can identify trends that might signal developing heart problems. In one or more embodiments, downstream tasks may further include advanced parameter prediction machine learning models can estimate various heart-related parameters, including, but not limited to, Ejection Fraction (EF): Measures heart pumping efficiency, Left Ventricular Mass Index (LVMI): Indicates heart muscle thickness, Filling Pressures: Pressure within heart chambers before contraction, Chamber Volumes and Surface Areas: Estimates of heart chamber sizes, Number of Pulmonary Veins (PVs): Detects abnormalities in blood vessels from lungs to the heart, Valve and Vessel Dimensions: Assesses size and function of heart valves and major blood vessels, Vascular Pressures: Estimates pressure within blood vessels and the like. In one or more embodiments, downstream tasks may further include monitoring mechanical and anatomical parameters of the heart through the use of ECG images 136, such as standardized data. In one or more embodiments, parameters include may include aortic valve diameter, number of pulmonary veins (PVs), and volumetric measurements of chambers (e.g., surface area and volume). In one or more, ECG machine learning model 184 may be configured to perform one or more downstream tasks as described above. In one or more embodiments, ECG machine learning model 184 may be configured to determine similarities and differences between two sets of ECG signals. For example, and without limitation ECG machine learning model 184 may be configured to identify similarities and/or differences between two particular sets of ECG signals such as but not limited to, changes in waveform, changes in amplitude and the like. In one or more embodiments, ECG machine learning model 184 may include trained ECG image 136 decoder. In one or more embodiments, parameter values 168 of ECG image 136 decoder may be used to train and/or pretrain ECG machine learning model 184. In one or more embodiments, ECG machine learning model 184 may be pretrained to identify relevant features and/or representation that may be used for medical diagnostic prediction. "Medical diagnostic prediction" as described in this disclosure refers to a predicted medical diagnoses output by a machine learning model. For example, and without limitation, medical diagnostic prediction may include heart arrythmia wherein the machine learning model may predict that a patient is suffering from a heart arrythmia. In one or more embodiments, ECG machine learning model 184 may be configured to receive ECG images 136 and output medical diagnostic predictions. In one or more embodiments, medical diagnostic predictions may include any medical issues, diagnosis and/or the like as described in this disclosure.

With continued reference to FIG. 1, ECG image encoder 152 and/or ECG machine learning model 184 may be pretrained using a large data set of data associated with differing modalities 124. In one or more embodiments, ECG image encoder 152 and/or ECG machine learning model 184 may be pretrained for downstream tasks such as detecting arrhythmias, predicting heart conditions, or identifying patterns related to specific diseases, without requiring large amounts of labeled data for each new task. In an embodiment, ECG machine learning model 184 may be pretrained using a large data set of unlabeled data, such as for example, multimodal dataset 120. In one or more embodiments, ECG machine learning model 184 may then be trained on a smaller data set of labeled training data 188. In one or more embodiments, ECG machine learning model 184 may be pretrained to identify relevant features. In one or more embodiments, ECG machine learning model 184 may then be trained using a labeled training data 188 set to assign labels to the identified relevant features.

With continued reference to FIG. 1, processor 108 may be configured to pretrain ECG machine learning model 184. In one or more embodiments, pretraining ECG machine learning model 184 may include adjusting one or more parameter values 168 of the machine learning model. In one or more embodiments, ECG image encoder 152 may be configured to output embeddings. In one or more embodiments, ECG image encoder 152 may be trained to modify outputs based on their respective distances from associated embedded pairs 180. In one or more embodiments, ECG image encoder 152 may be iteratively trained by adjusting parameter values 168. In one or more embodiments, parameter values 168 may be iteratively adjusted in order to output embeddings that are closer together. In one or more embodiments, pretraining ECG machine learning model 184 may include pretraining ECG machine learning model 184 as a function of the trained ECG image encoder 152. In one or more embodiments, system 100 may utilize one or more transfer learning techniques in order to train ECG machine learning model 184. In one or more embodiments, learned features of ECG image encoder 152 may be used to train ECG machine learning model 184.

With continued reference to FIG. 1, processor 108 may be configured to train ECG machine learning model 184 as a function of one or more parameter values 168 of ECG machine learning model 184 and a labeled set of training data. A "labeled set of training data" or "labeled training data" as referred to herein refers to training data that has been labeled such that the training data contains inputs and correlated labeled outputs. For example, and without limitation, labeled training data 188 may include inputs such as ECG images 136 and correlated outputs labeling the ECG images 136 with various cardiac abnormalities, abnormal heart rhythms and the like. In one or more embodiments, labeled training may include inputs such as ECG signals and/or images of ECG signals and correlated outputs indicating abnormalities, wave patterns, arrythmia and/or other heart conditions. In one or more embodiments, labeled training data 188 may be generated by a user, 3$^{rd}$ party and the like. In one or more embodiments, labeled training data 188 may be received from previous iterations of the processing wherein previously received ECG images 136 may be given a label through user input in order to increase the amount of labeled training data 188. In one or more embodiments, labeled training data 188 may be iteratively refined and/or modified in order to ensure that inputs contain correct labels and/or correlated outputs. In one or more embodiments, A set of labeled training data 188 may include labeled training data 188 for a particular purpose associated with heart abnormalities. For example, and without limitation, set of labeled training data 188 may include training data exclusively for classification, training data exclusively for pattern recognition, Training data for predicting previous abnormalities, training data for predicting future abnormalities and the like.

With continued reference to FIG. 1, processor 108 may finetune a pre-trained machine learning model, such as ECG machine leaning model, that has been trained on a large set of unlabeled training data 188 such as multimodal dataset 120. In one or more embodiments, ECG machine learning model 184 may be pre trained to identify patterns and features within ECG images 136. In one or more embodiments, processor 108 1 may feed ECG machine learning model 184 with labeled training data 188 in order to adjust the parameters of ECG machine learning model 184 to generate outputs associated with ECG images 136. In one or more embodiments, processor 108 may update parameters using one or more back propagation techniques. In one or more embodiments, backpropagation techniques may include a processor 108 feeding error rates through a neural network to make the neural network more accurate. In one or more embodiments, errors between the machine learning models predictions and true labels are used to update the model's weights such as parameter values 168. In one or more embodiments, labeled training data 188 may be used to predict outputs associated with an ECG images 136 wherein outputs of ECG machine learning model 184 may be compared to the true value of the outputs as indicated by labeled training data 188. In one or more embodiments, regularization techniques such as dropout of weight decay may be used in order to prevent ECG machine learning model 184 from memorizing the small set of labeled training data 188. In one or more embodiments, training ECG machine learning model 184 may include fine tuning already generated parameter values 168 for a particular purpose.

In one or more embodiments, processor 108 may use one or more transfer learning processes to train ECG machine learning model 184. In one or more embodiments, fine tuning may include a process in which insights, features, representations and the like generated during a pre-training phase can be used and applied to current machine learning models. For example, and without limitation, representations learned may be applied to various machine learning models to generate more accurate outputs. In one or more embodiments, processor 108 may use one or more feature extraction processes to extract high level representations of the data received and use those high level representations as inputs into the new model. In one or more embodiments, transfer learning may allow for learned features to be fine-tuned to a specific task or process. For example, and without limitation, extracted features may include recognizing particular patterns, frequencies and the like wherein said particular patterns and frequencies may be used to identify abnormalities. In one or more embodiments, during transfer learning the new model is initialized from weights, parameter values 168 and the like generated during pre-training. In one or more embodiments, parameter values 168 may then be fine-tuned by introducing a labeled training data 188 set. In one or more embodiments, learned representations may be used to identify abnormalities in ECG signals and/or images, classify patterns in ECG signals and/or images to disease states and the like. In one or more embodiments, pretraining ECG machine learning model 184 may allow for generalization wherein ECG machine learning model 184 may be configured to adapt to new unseen data due to the vast amount of data within multimodal dataset 120 received. In one or more embodiments, a smaller dataset of labeled training data 188 may prevent generalization as the machine learning model may not be trained to properly analyze unseen data. In one or more embodiments, pre training ECG machine learning model 184 may allow for generalization. In one or more embodiments, ECG machine learning model 184 may be trained following each iteration of system 100. In one or more embodiments, a user may iteratively provide feedback in order to train ECG machine learning model 184. In one or more embodiments, ECG machine learning model 184 may be pretrained using a large data set in order to reduce the training of ECG machine learning model 184. In one or more embodiments, pre training ECG machine learning model 184 may allow for more accurate outputs and as a result, less computational power needed to iteratively train ECG machine learning model 184.

With continued reference to FIG. 1, ECG machine learning model 184 may be configured to receive one or more ECG images 136 and/or inputs associated with a patient and output one or more diagnostic labels 196 associated with the patient. In an embodiment, inputs may include ECG signals contained within an image. As used in the current disclosure, a "diagnostic label" is a label used describe a specific condition, disorder, or illness that affects an individual's health or heart structure or function. A diagnostic label 196 may be any specific condition, disorder, or illness, specifically associated with the heart. In a non-limiting example, diagnostic labels 196 may be associated with conditions related to the cardiac health such as normal sinus rhythm, atrial fibrillation, myocardial infarction, ventricular tachycardia, bundle branch bloc, arrythmias, ischemic heart disease, heart enlargement, conduction abnormalities, cardiac ischemia, electrolyte imbalances, and the like. In one or more embodiments, diagnostic label 196 may include and/or be included within medical diagnostic prediction. Processor 108 may assign a diagnostic label 196 to a patient as function of an ECG input 192 received. An "ECG input" as described in this disclosure is an input received by ECG machine learning model 184. In one or more embodiments, EWCG input may include an ECG image 136 and/or ECG signal 132 received by one or more sensors connected to a patient. In one or more embodiments, ECG input 192 may include any data entries 128 as described in this disclosure. In one or more embodiments, ECG input 192 may include but is not limited to, ECG signals. ECG images 136, an electronic health record 140 and/or the like. In one or more embodiments. ECG training data may contain a plurality of ECG inputs 192 and correlated diagnostic labels 196. In an embodiment, ECG training data may be generated by a user, 3rd party or the like. In one or more embodiments, ECG training data may be received from electronic health records 140 containing ECG inputs 192 and correlated diagnostic labels 196.

With continued reference to FIG. 1, ECG inputs 192 may include images of ECG signals. In one or more embodiments, processor 108 may be configured to perform image classification using an image classifier wherein processor 108 may be configured to detect various features of ECG inputs 192 and assign diagnostic labels 196 based on the various features. An "image classifier," as used in this disclosure is a machine-learning model, such as a mathematical model, neural net, or program generated by a machine-learning algorithm known as a "classification algorithm," as described in further detail below, that sorts inputs of image information into categories or bins of data, outputting the categories or bins of data and/or labels associated therewith. Image classifier may be configured to output at least a datum that labels or otherwise identifies a set of images that are clustered together, found to be close under a distance metric as described below, or the like. Computing device 104 and/or another device may generate image classifier using a classification algorithm, defined as a process whereby computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. In some cases, processor 108 108 may use an image classifier to identify a key image in data described in any data described in this disclosure. As used herein, a "key image" is an element of visual data used to identify and/or match elements to each other. An image classifier may be trained with binarized visual data that has already been classified to determine key images in any other data described in this disclosure. "Binarized visual data" for the purposes of this disclosure is visual data that is described in binary format. For example, binarized visual data of a photo may be comprised of ones and zeroes wherein the specific sequence of ones and zeros may be used to represent the photo. Binarized visual data may be used for image recognition wherein a specific sequence of ones and zeroes may indicate a product present in the image. An image classifier may be consistent with any classifier as discussed herein. An image classifier may receive input data (e.g. ECG inputs 192 and/or images of ECG signals) described in this disclosure and output a key image with the data. In an embodiment, image classifier may be used to compare visual data in data such as ECG inputs 192 with visual data in another data set. Visual data in another data set may include a plurality of visual data retrieved from database 116. In some cases, image classifier may identify one or more components within ECG input 192. In some cases, image classifier may classify various vector loops, various cardiac vectors, and the like within ECG input 192. In one or more embodiments, a particular vector loop, cardiac vector and the like within the image may be associated with a particular diagnostic label 196.

With continued reference to FIG. 1, processor 108 may employ pattern matching techniques to identify specific patterns or abnormalities within the ECG input 192 to generate diagnostic label 196. This can involve comparing specific segments, intervals, or waveforms of the ECG input 192 to detect similarities or differences. Cross-correlation, template matching, or dynamic time warping algorithms may be used for this purpose. Processor 108 may perform statistical analysis on various parameters derived from the ECG input 192 to generate diagnostic label 196. This can involve calculating means, standard deviations, or other statistical measures for specific features or segments of the ECG input 192. By comparing these statistical parameters, the computer can identify significant differences or similarities between the ECG input 192 and a reference image. In one or more embodiments, ECG machine learning model 184 may include a machine learning model configured to receive images as inputs and output diagnostic label 196. In one or more embodiments, ECG machine learning model 184 may be trained as a function of labeled training data 188 and/or ECG image encoder 152.

Figure 2:
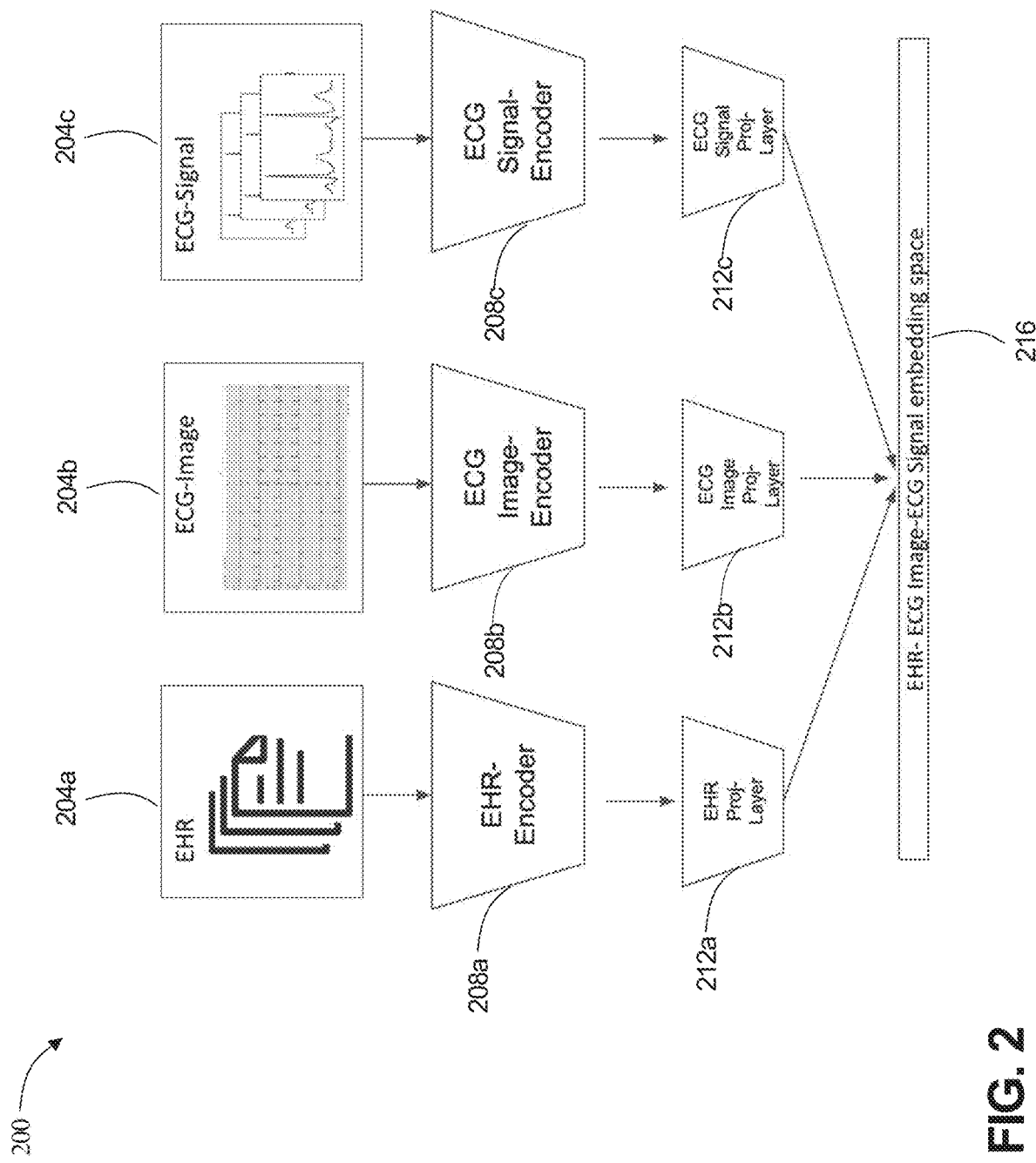
FIG. 2 is an exemplary embodiment of a system for projection mapping.

Referring now to FIG. 2, a system 200 for projection mapping is described. In one or more embodiments, system 200 may include data entries 204a-c. In one or more embodiments, a first data entry 204a may include electronic health records such as any electronic health records as described in this disclosure. In one or more embodiments, second data entry 204b may include ECG images such as any ECG images as described in this disclosure. In one or more embodiments, a third data entry 204c may include ECG signals such as any ECG signals as described in this disclosure. In one or more embodiments, each data entry 204a-c may be associated with a differing modality. For example, and without limitation, first data entry 204a may include textual information, second data entry 204b may include information in the form of pixels and/or images. In one or more embodiments, third data entry 204c may include information in the form of signals. In one or more embodiments, data entries 204a-c may be fed into encoders 208a-c. Encoders 208a-c may include any encoders as described in this disclosure. In one or more embodiments, first data entry 204a may be fed into a first encoder 208a. In one or more embodiments, first encoder 208a may include an EHR encoder as described in this disclosure. In one or more embodiments, second data entry 204b may be fed into second data encoder 208b. In one or more embodiments, second data encoder 208b may include an ECG image encoder as described in reference to at least FIG. 1. In one or more embodiments, third data entry 204c may be fed into a third data encoder 208c. In one or more embodiments, third data encoder 208c may include an ECG signal encoder. In one or more embodiments, encoders 208a-c may be configured to receive data entries 204a-c and generate embeddings. In one or more embodiments, embeddings may include numerical representations of data entries 204a-c. In one or more embodiments, embeddings may include vectors. In one or more embodiments, embeddings from differing modalities may have varying dimensions and/or characteristics. In one or more embodiments, system 200 may include projection layers 212a-c in order to align embeddings from differing modalities into a shared embedding space 216. A "projection layer" as described in this disclosure is a system that transforms embeddings produced by an encoder into a common representation. For example, and without limitation projection layer may receive an embedding associated with an ECG as an input and produce an output that would allow embeddings associated with the ECG image and Embeddings associated with an ECG signal to be mapped within the same shared embedding space 216. In one or more embodiments, projections layers 212a-c may include a neural network layer that transforms embeddings produced by an encoder into a common representation amongst multiple differing modalities. In one or more embodiments, projection layer may allow for embeddings produced by differing encoders to be mapped within the same shared embedding space 216. In one or more embodiments, projection layers 212a-c may transform embeddings into a common feature space such that embeddings from differing modalities may be compared. In one or more embodiments data entries from differing modalities may include differing features, differing structures and/or the like. In one or more embodiments, projection layers 212a-c may preserve important modality-specific features while allowing for data entries from differing modalities to be aligned. In one or more embodiments, embeddings may differ in size, may capture features differently due to the nature of the data and/or the like. In one or more embodiments, projection layers 212a-c may map the output of encoders 208a-c into a consistent format. For example and without limitation, all embeddings may be transformed into a 128-dimensional vector. In one or more embodiments, outputs of projection layers 212a-c may be consistent with one another, thereby allowing data from differing modalities to be mapped into shared embedding space 216. In one or more embodiments, projection layers 212a-c may be reduce dimensionality for shared embedding space. In one or more embodiments, projection layers 212a-c may make embeddings comparable across differing modalities in order to enable contrastive learning as described above. In one or more embodiments, projection layers 212a-c may transform the input embedding through a weighted matrix multiplication, thereby allowing for the embeddings to contain commonality within shared embedding space. In one or more embodiments, outputs of projection layers 212a-c may be mapped into shared embedding space 216. In one or more embodiments, encoders 212a-c may be iteratively refined and/or trained until embeddings containing similar information (e.g. embedded pairs) are mapped closer together within shared embedding space as described above.

With continued reference to FIG. 2, in one or more embodiments, ECG Image, ECG Signal and EHR data are passed through their respective encoding networks and then through a projection layer to bring all three modalities in a common feature space (the projection layers are discarded once the training is done). The model learns the shared embedding space using the contrastive loss function. The ECG image encoder is the pivot in this space, meaning that despite variations in the ECG image format (for the same ECG signal) and augmentation (e.g., noise or distortions), the embeddings of the ECG image and the ECG signal should be consistent. The embedding space is structured such that the relationships between ECG image, ECG signal, and EHR data are preserved.

Figure 3:
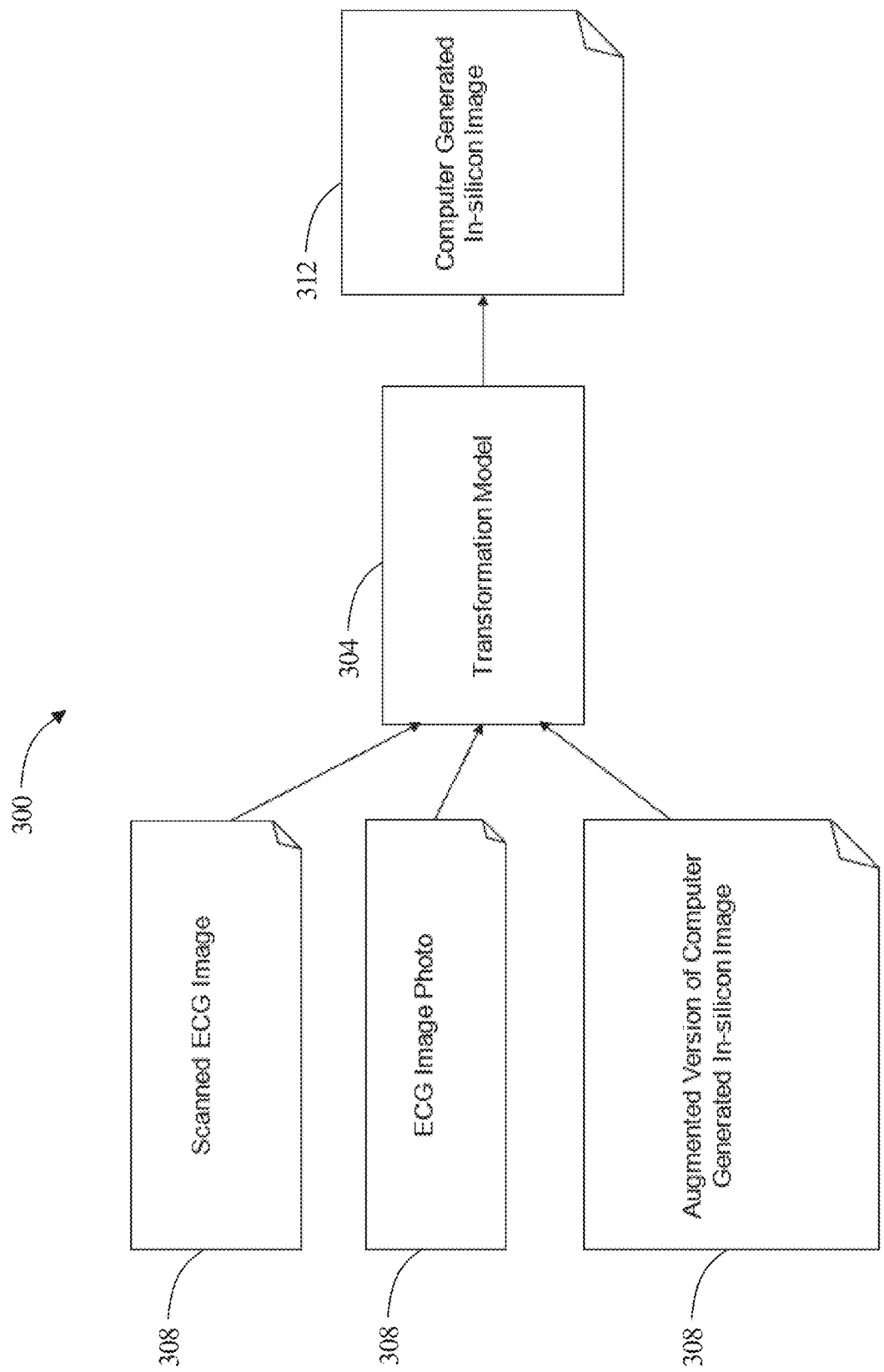
FIG. 3 is an exemplary embodiment of a system for transforming images in accordance with the subject disclosure.

Referring now to FIG. 3, an exemplary embodiment of a system 300 for transforming images is described. In one or more embodiments, system include a transformation model 304 is described. In one or more embodiments, transformation model 304 may include ECG transformation model as described above. In one or more embodiments, inputs 308 into transformation model 304 may include inputs 308 such as scanned ECG images, ECG images photos taken by a camera and/or augmented versions of computer-generated images.

Transformation model 304 may receive inputs and generate outputs 312. In one or more embodiments, outputs may include synthetic images as described above. In one or more embodiments, outputs may include computer-generated-in silicon images. Transformation model 304 may be trained by taking in either augmented version of computer-generated in-silicon images or photo/scanned copy of printed ECG or screenshot of ECG as input and would be optimized to produce a pristine computer-generated in-silicon quality image as described in reference to FIG. 1. The transformation model 304 would output the same layout as the input layout. transformation model 304 may include a convolutional neural networks or transformer based neural networks or a combination of both. In one or more embodiments, transformation model 304 may include a Pix2pix model, wherein the Pix2pix model is a generative adversarial network that allows for image to image translation. In one or more embodiments, Pix2pix model may be trained by taking in either augmented version of computer-generated in-silicon images or photo/scanned copy of printed ECG signals such as ECG image as described above or screenshot of ECG as input and would be optimized to produce a pristine computer-generated in-silicon quality image such as EG visual data as described above. In one or more embodiments, Pix2pix model may be trained to map input images from one domain such as ECG images to output images in another domain, such as ECG visual data. In one or more embodiments, Pix2pix model may be trained using a data set of ECG images correlated to ECG visual data as described above. IN one or more embodiments, Pix2pix model may be trained to receive images of ECG signals associated with patients and generate in-silicon images which may be used by one or more machine learning models as described in this disclosure.

Figure 4:
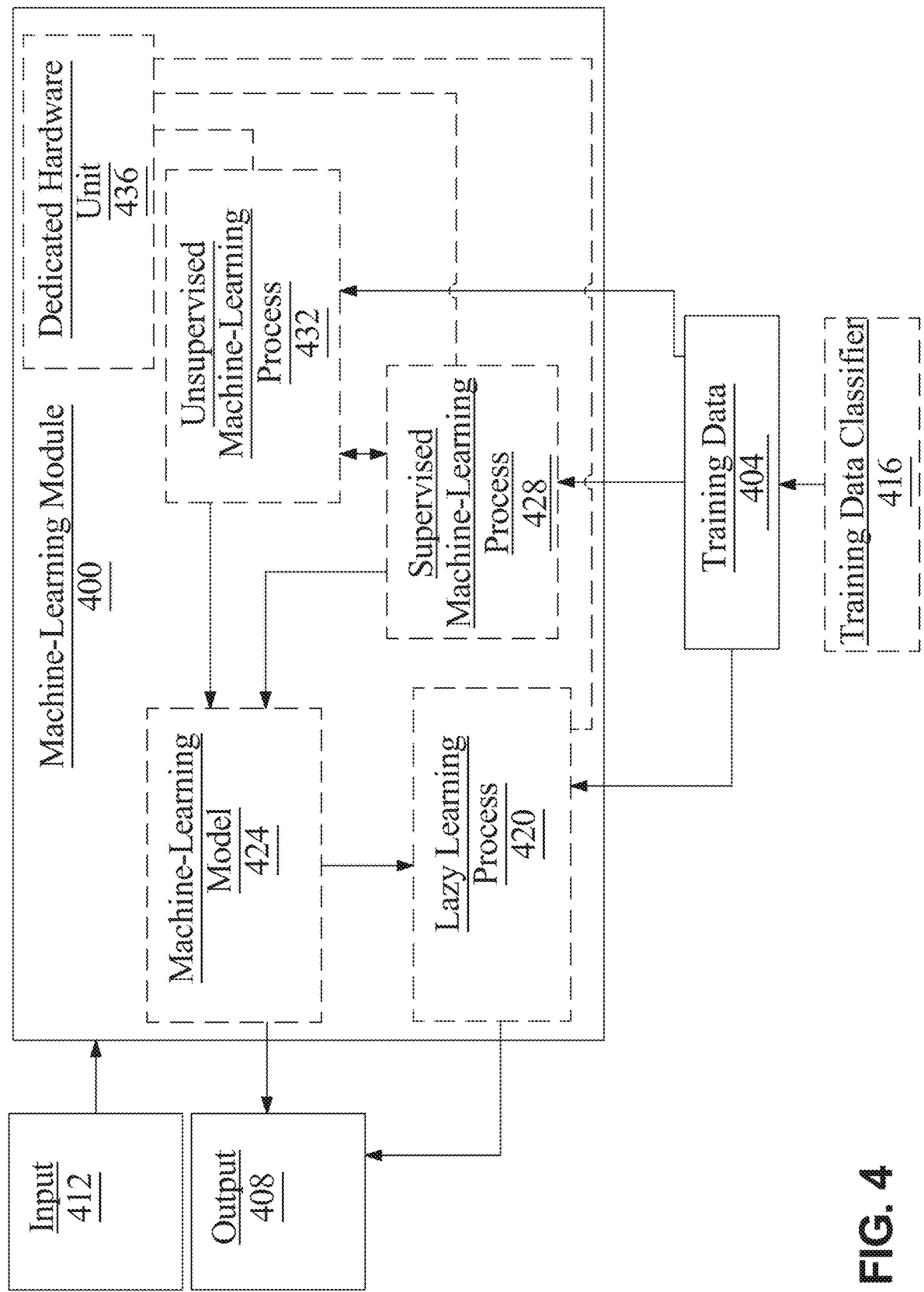
FIG. 4 is a block diagram of an exemplary machine-learning process.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include data entries and/or embeddings and outputs may include embeddings and/or modified embeddings based on alignment of embedded pairs within a shared embedding space.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to differing modalities, such as for example, ECG signals, ECG images, EHR records and/or the like.

Still referring to FIG. 4, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation a of a set or subset of values:

$$X_{new} = \frac{X - X_{mean}}{\sigma}.$$

Scaling may be performed using a median value of a a set or subset $X_{median}$ and/or interquartile range (IQR), which represents the difference between the 25$^{th}$ percentile value and the 50$^{th}$ percentile value (or closest values thereto by a rounding protocol), such as $$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input such as embeddings and/or data entries as described above as inputs, embeddings as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
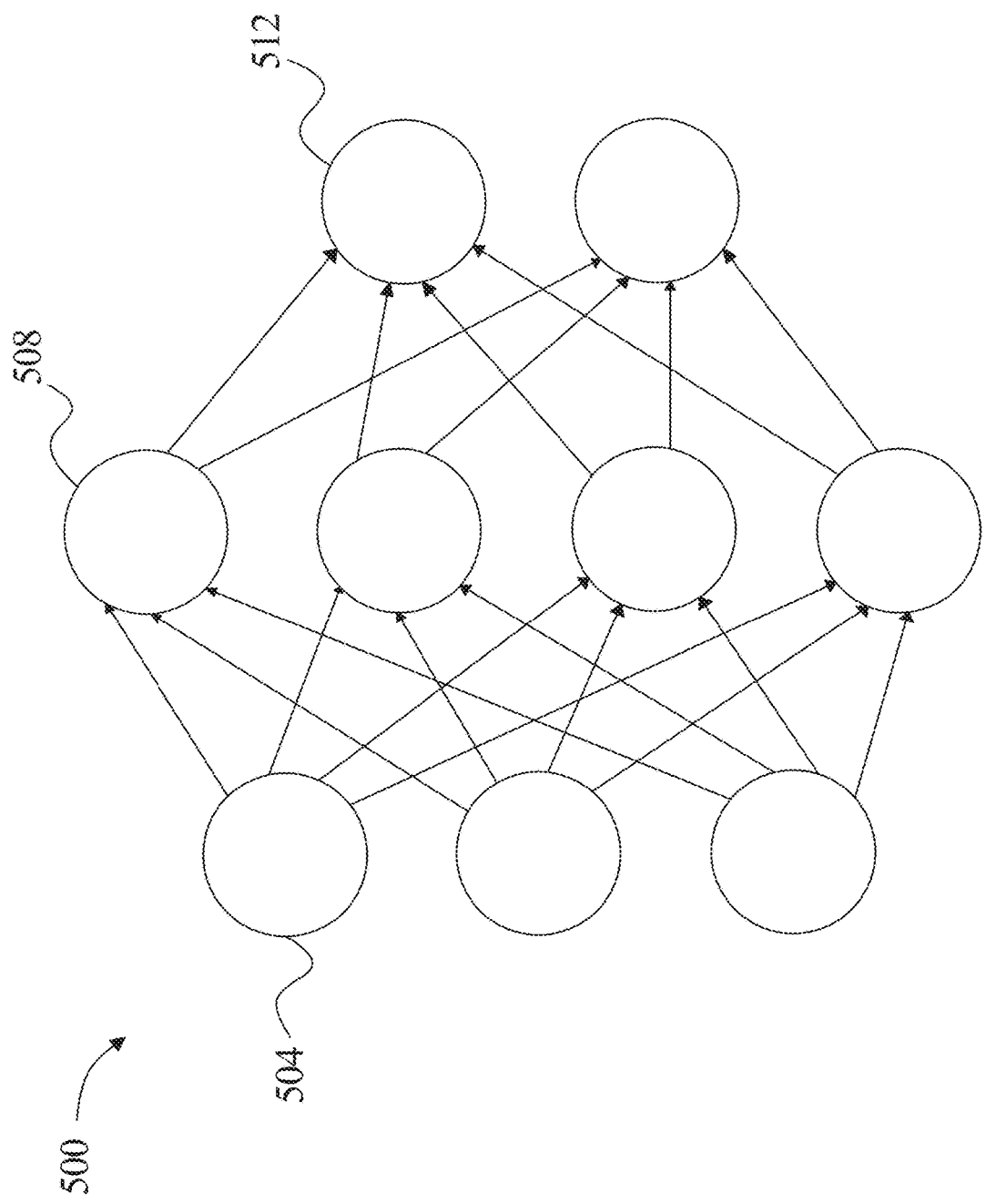
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
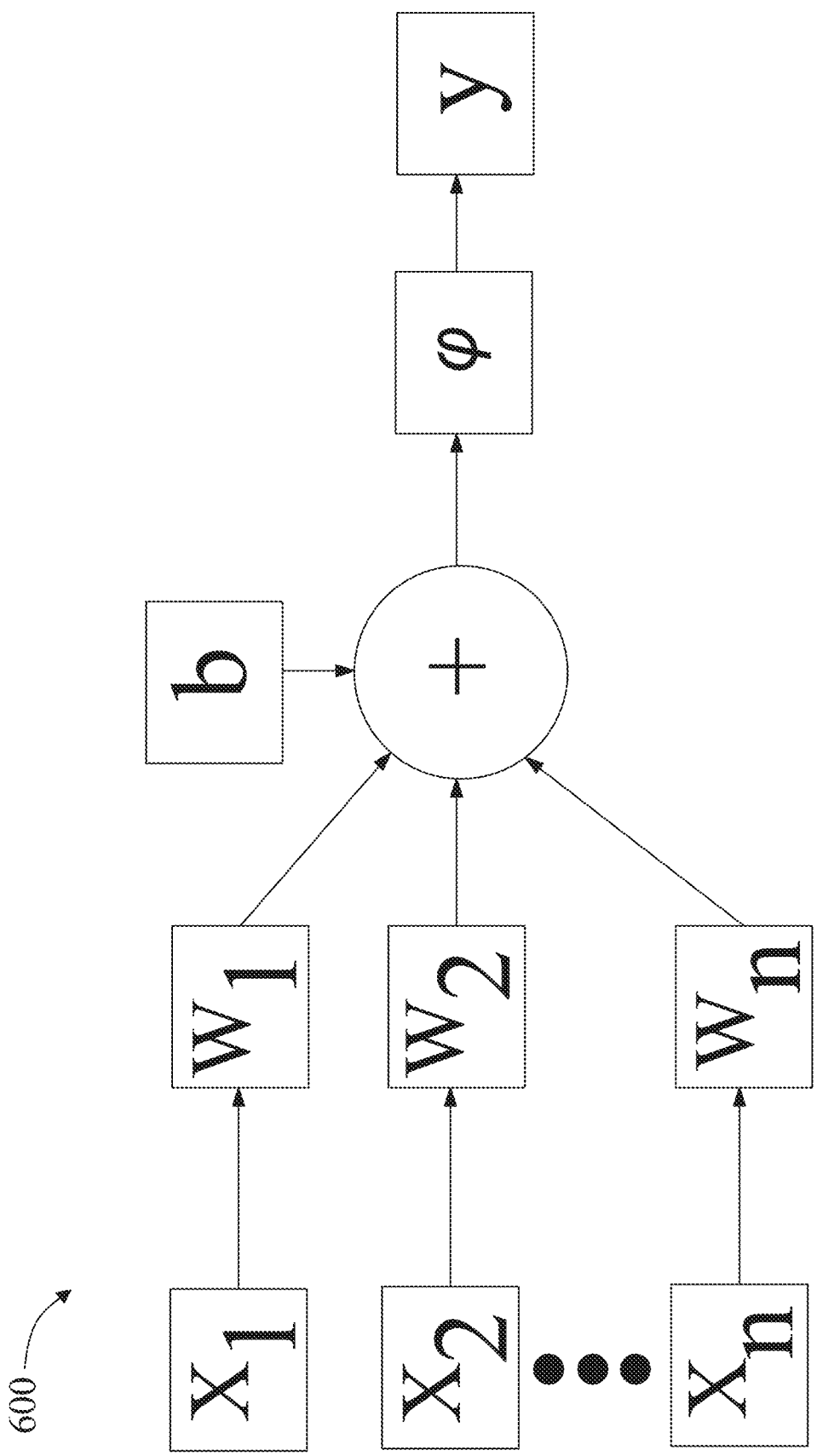
FIG. 6 is a diagram of an exemplary embodiment of a node of a neural network.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
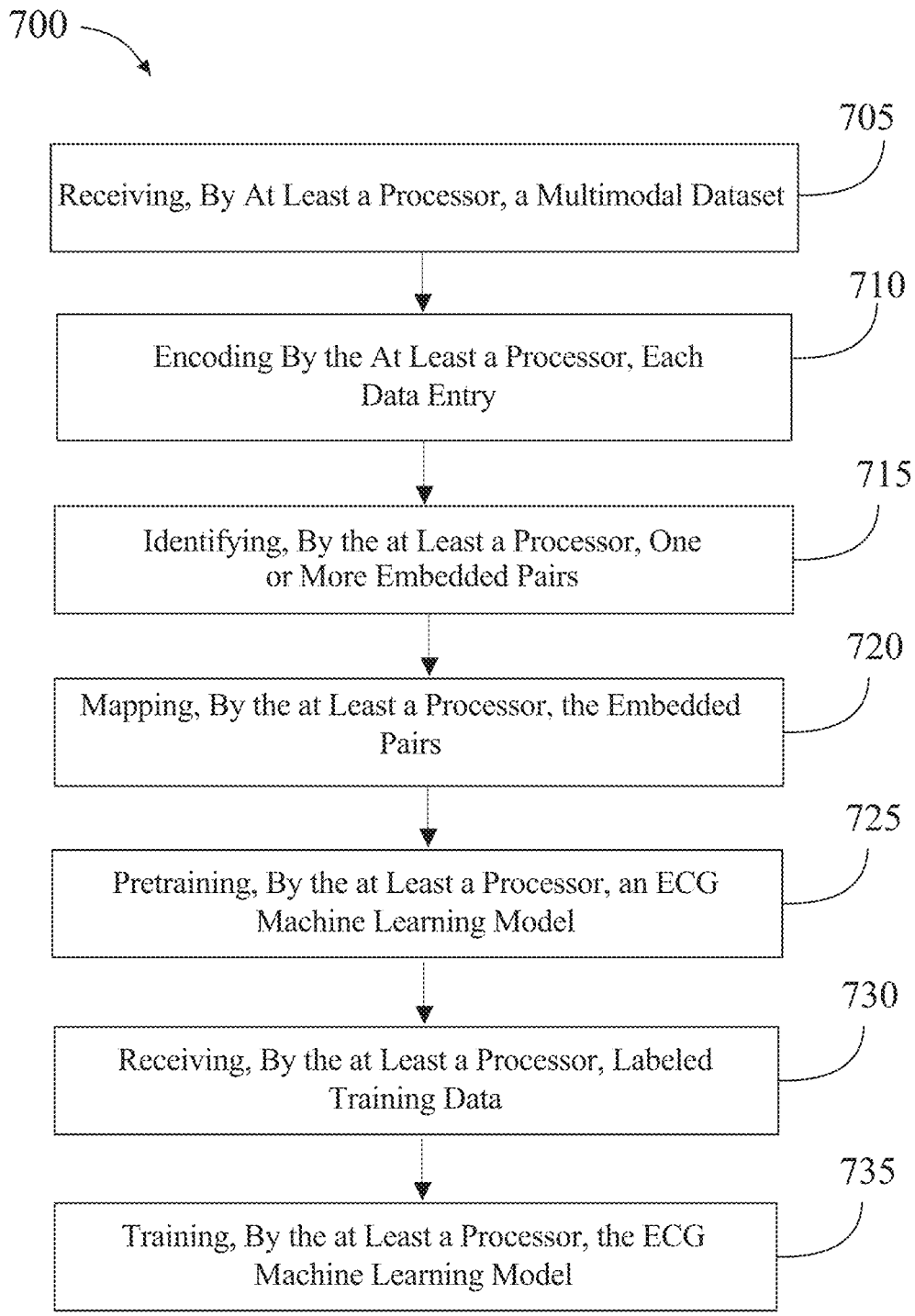
FIG. 7 is a flow diagram illustrating an exemplary embodiment of a method training multimodal self-supervised models.

Referring now to FIG. 7, an exemplary method 700 for training multimodal self-supervised models is described. At step 705, method 700 includes receiving, by at least a processor, a multimodal dataset including one or more modalities associated with a plurality of patients, wherein each modality includes a plurality of data entries. In one or more embodiments, the one or more modalities include a plurality of electrocardiogram (ECG) signals, a plurality of ECG images associated with the plurality of ECG signals and/or a plurality of electronic health records associated with the plurality of patients. This may be implemented with reference to FIGS. 1-6 and without limitation.

With continued reference to FIG. 7, at step 710 method 700 includes encoding, by the at least a processor, each data entry of the plurality of data entries within each modality of the one or more modalities into a single data format to create an encoded multimodal dataset including one or more encoded modalities. In one or more embodiments, encoding, by the at least a processor, each data entry of the plurality of data entries within each modality of the one or more modalities into the single data format includes receiving a plurality of ECG signals and a plurality of ECG images, generating a plurality of ECG visual data from the plurality of ECG signals and training an ECG image encoder as a function of the plurality of ECG visual data and the plurality of ECG images. In one or more embodiments, generating the plurality of ECG visual data from the plurality of ECG signals includes generating a plurality of synthetic images from the plurality of ECG signals and generating the plurality of ECG visual data as a function of the plurality of synthetic images, wherein the ECG visual data includes augmented images. In one or more embodiments, the plurality of synthetic images includes a plurality of images having differing formats. In one or more embodiments, encoding, by the at least a processor, by the at least a processor each modality of the plurality of modalities within the multimodal set includes receiving one or more encoders, wherein each encoder of the one or more encoders is associated with a differing modality of the one or more modalities and encoding each data entry of the plurality of entry as a function of the one or more modalities. In one or more embodiments, at least one encoder of the one or more encoders includes a convolutional network configured to encode an image into a numerical representation. This may be implemented with reference to FIGS. 1-6 and without limitation.

With continued reference to FIG. 7, at step 715 method 700 includes identifying, by the at least a processor, one or more embedded pairs as a function of the one or more encoded modalities, wherein each embedded pair of the one or more embedded pairs is associated with a separate patient of the plurality of patients. In one or more embodiments, each embedded pair includes at least one ECG signal of the plurality of ECG signals, at least one ECG image of the plurality of ECG images and at least one electronic health record of the plurality of electronic health records. In one or more embodiments, identifying, by the at least a processor, the one or more embedded pairs as a function of the one or more encoded modalities includes modifying a contrastive loss between encoded modalities associated with a same patient of the plurality of patients. This may be implemented with reference to FIGS. 1-6 and without limitation.

With continued reference to FIG. 7, at step 720 method 700 includes mapping, by the at least a processor, the embedded pairs within a shared embedding space. This may be implemented with reference to FIGS. 1-6 and without limitation.

With continued reference to FIG. 7, at step 725 method 700 includes pretraining, by the at least a processor, an ECG machine learning model as a function of the mapping by adjusting one or more parameter values of the ECG machine learning model. In one or more embodiments, pretraining, by the at least a processor, the ECG machine learning model as a function of the mapping includes pretraining the ECG machine learning model as a function of the trained ECG image encoder. This may be implemented with reference to FIGS. 1-6 and without limitation.

With continued reference to FIG. 7 at step 730 method 700 includes receiving, by the at least a processor, labeled training data. This may be implemented with reference to FIGS. 1-6 and without limitation.

With continued reference to FIG. 7, at step 735 method 700 includes training, by the at least a processor, the pretrained ECG machine learning model as a function of the labeled training data. In one or more embodiments, the ECG machine learning model is configured to receive an ECG input and output a diagnostic label. This may be implemented with reference to FIGS. 1-6 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
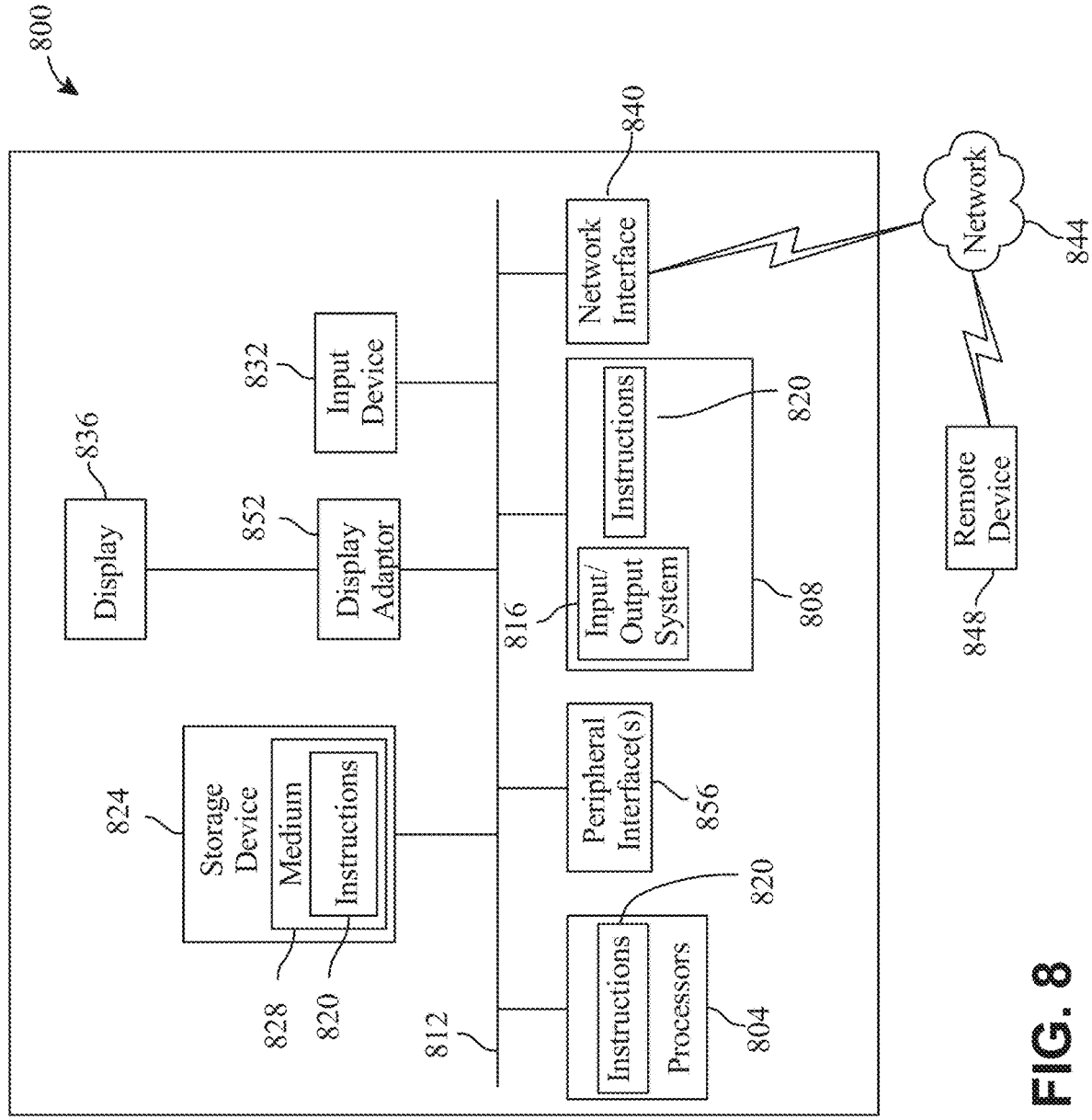
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for training multimodal self-supervised models, the system comprising:
   at least a processor; and
   a memory communicatively connected to the at least a processor, the memory containing instructions configuring the at least a processor to:
   receive a multimodal dataset comprising one or more modalities associated with a plurality of patients, wherein each modality comprises a plurality of data entries;
   encode each data entry of the plurality of data entries within each modality of the one or more modalities into a single data format to create an encoded multimodal dataset comprising one or more encoded modalities;

identify one or more embedded pairs as a function of the one or more encoded modalities, wherein each embedded pair of the one or more embedded pairs is associated with a separate patient of the plurality of patients;

map the one or more embedded pairs to a shared embedding space;

pretrain an electrocardiogram (ECG) machine learning model as a function of the mapping by adjusting one or more parameter values of the ECG machine learning model;

receive labeled training data;

sanitize the labeled training data, wherein sanitizing the labeled training data comprises:
   determining that at least one training data entry of the labeled training data has a signal to noise ratio below a threshold value; and
   removing the at least one training data entry from the labeled training data to create sanitized labeled training data; and train the pretrained ECG machine learning model as a function of the sanitized labeled training data.

2. The system of claim 1, wherein the one or more modalities comprise:
a plurality of electrocardiogram (ECG) signals;
a plurality of ECG images associated with the plurality of ECG signals; and
a plurality of electronic health records associated with the plurality of patients.

3. The system of claim 2, wherein each embedded pair comprises:
at least one ECG signal of the plurality of ECG signals;
at least one ECG image of the plurality of ECG images; and
at least one electronic health record of the plurality of electronic health records.

4. The system of claim 1, wherein encoding each data entry of the plurality of data entries within each modality of the one or more modalities into the single data format comprises:
receiving a plurality of ECG signals and a plurality of ECG images;
generating a plurality of ECG visual data from the plurality of ECG signals; and
training an ECG image encoder as a function of the plurality of ECG visual data and the plurality of ECG images.

5. The system of claim 4, wherein generating the plurality of ECG visual data from the plurality of ECG signals comprises:
generating a plurality of synthetic images from the plurality of ECG signals; and
generating the plurality of ECG visual data as a function of the plurality of synthetic images, wherein the ECG visual data comprises augmented images.

6. The system of claim 5, wherein generating the plurality of synthetic images comprises generating a plurality of images having differing layout formats.

7. The system of claim 4, wherein pretraining the ECG machine learning model as a function of the mapping comprises pretraining the ECG machine learning model as a function of the trained ECG image encoder.

8. The system of claim 1, wherein identifying the one or more embedded pairs as a function of the one or more encoded modalities comprises modifying a contrastive loss between encoded modalities associated with a same patient of the plurality of patients.

9. The system of claim 1, wherein encoding each modality of the plurality of modalities within the multimodal dataset comprises:
receiving one or more encoders, wherein each encoder of the one or more encoders is associated with a differing modality of the one or more modalities; and
encoding each data entry of the plurality of entry as a function of the one or more modalities.

10. The system of claim 9, wherein at least one encoder of the one or more encoders comprises a convolutional network configured to encode an image into a numerical representation.

11. A method for training multimodal self-supervised models, the method comprising:
receiving, by at least a processor, a multimodal dataset comprising one or more modalities associated with a plurality of patients, wherein each modality comprises a plurality of data entries;
encoding, by the at least a processor, each data entry of the plurality of data entries within each modality of the one or more modalities into a single data format to create an encoded multimodal dataset comprising one or more encoded modalities;
identifying, by the at least a processor, one or more embedded pairs as a function of the one or more encoded modalities, wherein each embedded pair of the one or more embedded pairs is associated with a separate patient of the plurality of patients;
mapping, by the at least a processor, the one or more embedded pairs to a shared embedding space;
pretraining, by the at least a processor, an electrocardiogram (ECG) machine learning model as a function of the mapping by adjusting one or more parameter values of the ECG machine learning model;
receiving, by the at least a processor, labeled training data;
sanitizing, by the at least a processor, the labeled training data, wherein sanitizing the labeled training data comprises:
   determining that at least one training data entry of the labeled training data has a signal to noise ratio below a threshold value; and
   removing the at least one training data entry from the labeled training data to create sanitized labeled training data; and
training, by the at least a processor, the pretrained ECG machine learning model as a function of the sanitized labeled training data.

12. The method of claim 11, wherein the one or more modalities comprise:
a plurality of electrocardiogram (ECG) signals;
a plurality of ECG images associated with the plurality of ECG signals; and
a plurality of electronic health records associated with the plurality of patients.

13. The method of claim 12, wherein each embedded pair comprises:
at least one ECG signal of the plurality of ECG signals;
at least one ECG image of the plurality of ECG images; and
at least one electronic health record of the plurality of electronic health records.

14. The method of claim 11, wherein encoding, by the at least a processor, each data entry of the plurality of data entries within each modality of the one or more modalities into the single data format comprises:
receiving a plurality of ECG signals and a plurality of ECG images;

generating a plurality of ECG visual data from the plurality of ECG signals; and training an ECG image encoder as a function of the plurality of ECG visual data and the plurality of ECG images.

15. The method of claim 14, wherein generating the plurality of ECG visual data from the plurality of ECG signals comprises:

generating a plurality of synthetic images from the plurality of ECG signals; and generating the plurality of ECG visual data as a function of the plurality of synthetic images, wherein the ECG visual data comprises augmented images.

16. The method of claim 15, wherein generating the plurality of synthetic images comprises generating a plurality of images having differing layout formats.

17. The method of claim 14, wherein pretraining, by the at least a processor, the ECG machine learning model as a function of the mapping comprises pretraining the ECG machine learning model as a function of the trained ECG image encoder.

18. The method of claim 11, wherein identifying, by the at least a processor, the one or more embedded pairs as a function of the one or more encoded modalities comprises modifying a contrastive loss between encoded modalities associated with a same patient of the plurality of patients.

19. The method of claim 11, wherein encoding, by the at least a processor, by the at least a processor each modality of the plurality of modalities within the multimodal dataset comprises:

receiving one or more encoders, wherein each encoder of the one or more encoders is associated with a differing modality of the one or more modalities; and encoding each data entry of the plurality of entry as a function of the one or more modalities.

20. The method of claim 19, wherein at least one encoder of the one or more encoders comprises a convolutional network configured to encode an image into a numerical representation.

* * * * *